US011412002B2

(12) United States Patent
Buchner et al.

(10) Patent No.: US 11,412,002 B2
(45) Date of Patent: *Aug. 9, 2022

(54) PROVISION OF POLICY COMPLIANT STORAGE FOR DID DATA

(71) Applicant: MICROSOFT TECHNOLOGY LICENSING, LLC, Redmond, WA (US)

(72) Inventors: Daniel James Buchner, Los Gatos, CA (US); Brandon Murdoch, Reading (GB); Ankur Patel, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

This patent is subject to a terminal disclaimer.

(21) Appl. No.: 16/355,417

(22) Filed: Mar. 15, 2019

(65) Prior Publication Data

US 2020/0296140 A1 Sep. 17, 2020

(51) Int. Cl.
*H04L 9/40* (2022.01)
*G06F 21/60* (2013.01)
(Continued)

(52) U.S. Cl.
CPC .......... *H04L 63/205* (2013.01); *G06F 21/604* (2013.01); *G06F 21/6245* (2013.01); *H04L 67/1097* (2013.01)

(58) Field of Classification Search
CPC . H04L 63/205; H04L 67/1097; H04L 9/0891; H04L 2209/38; H04L 9/0894;
(Continued)

(56) References Cited

U.S. PATENT DOCUMENTS 10,587,413 B1 * 3/2020 Todd ...................... H04L 9/3239
11,025,626 B1 * 6/2021 Todd ...................... H04L 63/08
(Continued)

FOREIGN PATENT DOCUMENTS

EP 2993606 A1 3/2016
WO 2019033116 A1 2/2019

OTHER PUBLICATIONS

Jamsrandorj, Uurtsaikh, "Decentralized Access Control Using Blockchain", In The Thesis Submitted to the College of Graduate and Postdoctoral Studies in Partial Fulfillment of the Requirements for the degree of Master of Science in the Department of Computer Science, University of Saskatchewan, Aug. 31, 2017, 87 Pages.

(Continued)

*Primary Examiner* — Michael R Vaughan
(74) *Attorney, Agent, or Firm* — Workman Nydegger

(57) ABSTRACT

Enforcing different policy rules that are applicable to different types of data. A plurality of DIDs and a plurality of storages are managed by a computing system. Each of the plurality of storages is associated with at least one of the plurality of DIDs. Receive a request from an entity for operating on data stored or to be stored in one of the plurality of storages. Determine a type of the data requested to be operated on. Access one or more policy rules that are applicable to the type of the data. Based on the accessed one or more policy rules, determine whether the operation to be performed on the data will result in the data complying with the one or more policy rules. Based on the determination, allow or deny the request.

20 Claims, 13 Drawing Sheets

(51) Int. Cl.
*G06F 21/62* (2013.01)
*H04L 67/1097* (2022.01)

(58) Field of Classification Search
CPC ..... H04L 9/3239; H04L 63/04; G06F 21/604; G06F 21/6245; G06F 21/6218
See application file for complete search history.

(56) References Cited

U.S. PATENT DOCUMENTS

| | | | |
|---|---|---|---|
| 11,101,986 B2* | 8/2021 | Carmignani | H04L 9/3239 |
| 2013/0275401 A1 | 10/2013 | Auger et al. | |
| 2017/0070536 A1* | 3/2017 | Mortman | H04L 63/20 |
| 2017/0109759 A1* | 4/2017 | Korb | G06Q 30/018 |
| 2017/0180320 A1* | 6/2017 | Nimmagadda | H04L 67/1031 |
| 2017/0195336 A1* | 7/2017 | Ouellette | H04L 63/102 |
| 2017/0250972 A1 | 8/2017 | Ronda et al. | |
| 2018/0020001 A1* | 1/2018 | White | G06F 21/604 |
| 2018/0234433 A1* | 8/2018 | Oberhauser | H04L 9/3236 |
| 2018/0285595 A1* | 10/2018 | Jessen | H04L 67/14 |
| 2019/0228406 A1* | 7/2019 | Patel | H04L 63/08 |
| 2019/0229914 A1 | 7/2019 | Patel et al. | |
| 2020/0036515 A1* | 1/2020 | Chari | H04L 9/3239 |
| 2020/0057671 A1* | 2/2020 | Bailey | G06F 9/505 |
| 2020/0092292 A1* | 3/2020 | Patel | H04L 9/0637 |
| 2020/0106610 A1* | 4/2020 | Doddavula | H04L 63/10 |
| 2020/0137064 A1* | 4/2020 | Wu | H04L 9/3239 |
| 2020/0204557 A1* | 6/2020 | Singh | H04L 9/0637 |
| 2021/0049586 A1* | 2/2021 | Teitelbaum | G06Q 20/382 |

OTHER PUBLICATIONS

"International Search Report and Written Opinion Issued in PCT Application No. PCT/US20/015752", dated Apr. 30, 2020, 14 Pages. (MS#405643-WO-PCT).

"Final Office Action Issued In U.S. Appl. No. 16/355,391", dated Sep. 13, 2021, 15 Pages.

"Non Final Office Action Issued In U.S. Appl. No. 16/355,391", dated Mar. 18, 2021, 17 Pages.

"Non Final Office Action Issued in U.S. Appl. No. 16/355,391", dated Dec. 7, 2021, 15 Pages.

"International Search Report & Written Opinion issued in PCT Application No. PCT/US20/015754", dated May 4, 2020, 13 Pages. (MS# 405652-WO-PCT).

Zhu, et al., "A Survey on Blockchain-Based Identity Management Systems for the Internet of Things", In Proceedings of International Conference on Internet of Things (iThings) and IEEE Green Computing and Communications (GreenCom) and IEEE Cyber, Physical and Social Computing (CPSCom) and IEEE Smart Data (SmartData), Jul. 30, 2018, pp. 1568-1573.

U.S. Appl. No. 16/355,417, filed Mar. 15, 2019.
U.S. Appl. No. 16/355,391, filed Mar. 15, 2019.

"Notice of Allowance Issued in U.S. Appl. No. 16/355,391", dated Apr. 6, 2022, 18 Pages.

* cited by examiner

PROVISION OF POLICY COMPLIANT STORAGE FOR DID DATA

BACKGROUND OF THE INVENTION

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of ledger, which provides a fairly secure platform. Since a DID is generally not controlled by a centralized management system but owned by an owner of the DID, DIDs are sometimes referred to as identities without authority. However, in reality, different countries or organizations may mandate specific requirements and rules about what options and rights individuals should have. Specifically, certain types of data at different locations or within different organizations may be required to be handled differently.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems, and methods for enforcing different policy rules that are applicable to different types of data. The computing system and methods are implemented in a decentralized network that implements a distributed ledger, the distributed ledger being configured to backup one or more decentralized identifier (DID) for one or more users of the computing system. A plurality of DIDs and a plurality of storages are managed by the computing system. Each of the plurality of storages is associated with at least one of the plurality of DIDs. First, a request from an entity for operating on data stored or to be stored in a storage that is associated with a particular DID is received. The type of the data that is requested to be operated on is then determined. Thereafter, one or more policy rules that are applicable to the determined type of data are accessed. Based on the accessed one or more policy rules, a determination is made on whether the operation to be performed on the data will result in the data complying with the one or more policy rules. When it is determined that the operation will result the data complying with the one or more policy rules, the request is then allowed.

Additional features and advantages will be set forth in the description which follows, and in part will e obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 9 illustrates a flow chat of an example method for determining a type of data that is requested to be operated on;

DETAILED DESCRIPTION

Embodiments disclosed herein are related to computing systems, and methods for enforcing different policy rules that are applicable to different types of data. The computing system and methods are implemented in a decentralized network that implements a distributed ledger, the distributed ledger being configured to backup one or more decentralized identifier (DID) for one or more users of the computing system. A plurality of DIDs and a plurality of storages are managed by the computing system. Each of the plurality of storages is associated with at least one of the plurality of DIDs. First, a request from an entity for operating on data stored or to be stored in a storage that is associated with a particular DID is received. The type of the data that is requested to be operated on is then determined. Thereafter, one or more policy rules that are applicable to the determined type of data are accessed. Based on the accessed one or more policy rules, a determination is made on whether the operation to be performed on the data will result in the data complying with the one or more policy rules. When it is determined that the operation will result the data complying with the one or more policy rules, the request is then allowed.

The principles described herein provide a technical advance to allow the government laws and/or organization rules to be enforced in a decentralized environment, while still give the users (e.g., DID owners) great control over their own data.

Because the principles described herein may be performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
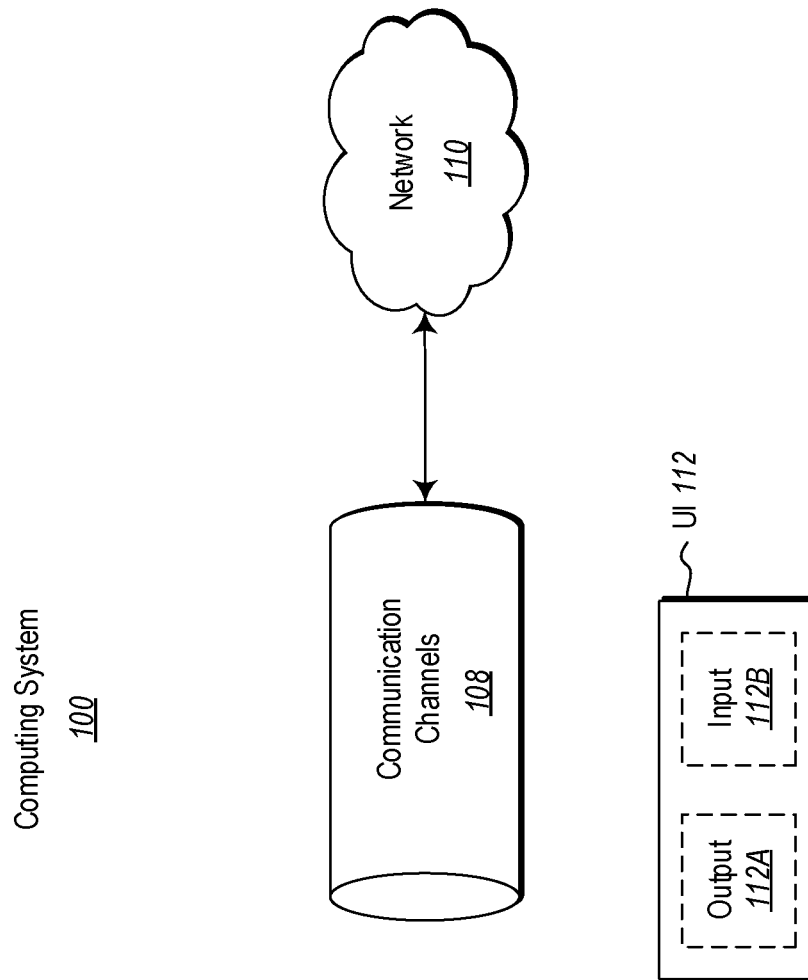
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Figure 2:
FIG. 2 illustrates an example environment for creating a decentralized identification (DID)

Some introductory discussion of a decentralized identification (DID) and the environment is which they are created and reside will not be given with respect to FIG. 2. As illustrated in FIG. 2, a DID owner 201 may own or control a DID 205 that represents an identity of the DID owner 201. The DID owner 201 may register a DID using a creation and registration service, which will be explained in more detail below.

The DID owner 201 may be any entity that could benefit from a DID. For example, the DID owner 201 may be a human being or an organization of human beings. Such organizations might include a company, department, government, agency, or any other organization or group of organization. Each individual human being might have a DID while the organization(s) to which each belongs might likewise have a DID.

The DID owner 201 may alternatively be a machine, system, or device, or a collection of machine(s), device(s) and/or system(s). In still other embodiments, the DID owner 201 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 might be an artificial intelligence. An artificial intelligence may also own a DID.

Thus, the DID owner 201 may be any reasonable entity, human or non-human, that is capable of creating the DID 205 or at least having the DID 205 created for and associated with them. Although the DID owner 201 is shown as having a single DID 205, this need not be the case as there may be any number of DIDs associated with the DID owner 201 as circumstances warrant.

As mentioned, the DID owner 201 may create and register the DID 205. The DID 205 may be any identifier that may be associated with the DID owner 201. Preferably, that identifier is unique to that DID owner 201, at least within a scope in which the DID is anticipated to be in use. As an example, the identifier may be a locally unique identifier, and perhaps more desirably a globally unique identifier for identity systems anticipated to operate globally. In some embodiments, the DID 205 may be a Uniform Resource identifier (URI) (such as a Uniform Resource Locator (URL)) or other pointer that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein). Accordingly, the DID 205 may be any identifier that is under the control of the DID owner 201 and independent of any centralize authority.

In some embodiments, the structure of the DID 205 may be as simple as a user name or some other human understandable term. However, in other embodiments, the DID 205 may preferably be a random string of number and letters for increased security. In one embodiment, the DID 205 may be a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 20. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair may be generated on a device controlled by the DID owner 201. The private key 206 and public key 207 pair should not be generated on a server controlled by any centralized authority as this may cause the private key 206 and public key 207 pair to not be fully under the control of the DID owner 201 at all times. Although FIG. 2 and this description have described a private and public key pair, it will also be noted that other types of reasonable cryptographic information and/or mechanism may also be used as circumstances warrant.

FIG. 2 also illustrates a DID document 210 that is associated with the DID 205. As will be explained in more detail to follow, the DID document 210 may be generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 may be implemented according to methods specified by a distributed ledger 220 that will be used to store a representation of the DID 205 as will be explained in more detail to follow. Thus, the DID document 210 may have different methods depending of the specific distributed ledger.

The DID document 210 also includes the public key 207 created by the DID owner 201 or some other equivalent cryptographic information. The public key 207 may be used by third party entities that are given permission by the DID owner 201 to access information and data owned by the DID owner 201. The public key 207 may also be used by verify that the DID owner 201 in fact owns or controls the DID 205.

The DID document 210 may also include authentication information 211. The authentication information 211 may specify one or more mechanisms by which the DID owner 201 is able to prove that the DID owner 201 owns the DID 205. In other words, the mechanisms of authentication information 211 may show proof of a binding between the DID 205 (and thus it's DID owner 201) and the DID document 210. In one embodiment, the authentication information 211 may specify that the public key 207 be used in a signature operation to prove the ownership of the DID 205. Alternatively or in addition, the authentication information 211 may specify that the public key 207 be used in a biometric operation to prove ownership of the DID 205. Accordingly, the authentication information 211 may include any number of mechanisms by which the DID owner 201 is able to prove that the DID owner 201 owns the DID 205.

The DID document 210 may also include authorization information 212. The authorization information 212 may allow the DID owner 201 to authorize third party entities the rights to modify the DID document 210 or some part of the document without giving the third party the right to prove ownership of the DID 205. For example, the authorization information 212 may allow the third party to update any designated set of one or more fields in the DID document 210 using any designated update mechanism. Alternatively, the authorization information may allow the third party to limit the usages of DID 205 by the DID owner 201 for a specified time period. This may be useful when the DID owner 201 is a minor child and the third party is a parent or guardian of the child. The authorization information 212 may allow the parent or guardian to limit use of the DID 201 until such time as the child is no longer a minor.

The authorization information 212 may also specify one or more mechanisms that the third party will need to follow to prove they are authorized to modify the DID document 210. In some embodiments, these mechanism may be similar to those discussed previously with respect to the authentication information 211.

The DID document 210 may also include one or more service endpoints 213. A service endpoint may include a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers may be used by the DID owner 201 or by third party entities to access the services that operate on behalf of the DID owner 201. Specific examples of service endpoints 213 will be explained in more detail to follow.

The ID document 210 may further include identification information 214. The identification information 214 may include personally identifiable information such as the name, address, occupation, family members, age, hobbies, interests, or the like of DID owner 201. Accordingly, the identification information 214 listed in the DID document 210 may represent a different persona of the DID owner 201 for different purposes. For instance, a persona may be pseudo anonymous, e.g., the DID owner 201 may include a pen name in the DID document when identifying him or her as a writer posting articles on a blog; a persona may be fully anonymous, e.g., the DID owner 201 may only want to disclose his or her job title or other background data (e.g., a school teacher, an FBI agent, an adult older than 21 years old, etc.) but not his or her name in the DID document; and a persona may be specific to who the DID owner 201 is as an individual, e.g., the DID owner 201 may include information identifying him or her as a volunteer for a particular charity organization, an employee of a particular corporation, an award winner of a particular award, etc.

The DID document 210 may also include credential information 215, which may also be referred to herein as an attestation. The credential information 215 may be any information that is associated with the DID owner 201's background. For instance, the credential information 215 may be (but not limited to) a qualification, an achievement, a government ID, a government right such as a passport or a driver's license, a payment provider or bank account, a university degree or other educational history, employment status and history, or any other information about the DID owner 201's background.

The DID document 210 may also include various other information 216. In some embodiments, the other information 216 may include metadata specifying when the DID document 210 was created and/or when it was last modified. In other embodiments, the other information 216 may include cryptographic proofs of the integrity of the DID document 210. In still further embodiments, the other information 216 may include additional information that is either specified by the specific method implementing the DID document or desired by the DID owner 201.

FIG. 2 also illustrates a distributed ledger or blockchain 220. The distributed ledger 220 may be any decentralized, distributed network that includes various computing systems that are in communication with each other. For example, the distributed ledger 220 may include a first distributed computing system 230, a second distributed computing system 240, a third distributed computing system 250, and any number of additional distributed computing systems as illustrated by the ellipses 260. The distributed ledger or blockchain 220 may operate according to any known standards or methods for distributed ledgers. Examples of conventional distributed ledgers that may correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 may be stored on the actual distributed ledger. Alternatively, in other embodiments the DID document 210 may be stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID hash 231, DID hash 241, and DID hash 251, which are ideally identical copies of the same DID. The DID hash 231, DID hash 241, and DID hash 251 may then point to the location of the DID document 210. The distributed ledger or blockchain 220 may also store numerous other representations of other DIDs as illustrated by references 232, 233, 234, 242, 243, 244, 252, 253, and 254.

In one embodiment, when the DID user 201 creates the DID 205 and the associated DID document 210, the DID hash 231, DID hash 241, and DID hash 251 are written to the distributed ledger or blockchain 220. The distributed ledger or blockchain 220 thus records that the DID 205 now exists. Since the distributed ledger or blockchain 220 is decentralized, the DID 205 is not under the control of any entity outside of the DID owner 201. The DID hash 231, DID hash 241, and DID hash 251 may include, in addition to the pointer to the DID document 210, a record or time stamp that specifies when the DID 205 was created. At a later date when modifications are made to the DID document 210, this may also be recorded in DID hash 231, DID hash 241, and DID hash 251. The DID hash 231, DID hash 241, and DID hash 251 may further include a copy of the public key 207 so that the DID 205 is cryptographically bound to the DID document 210.

Figure 3:
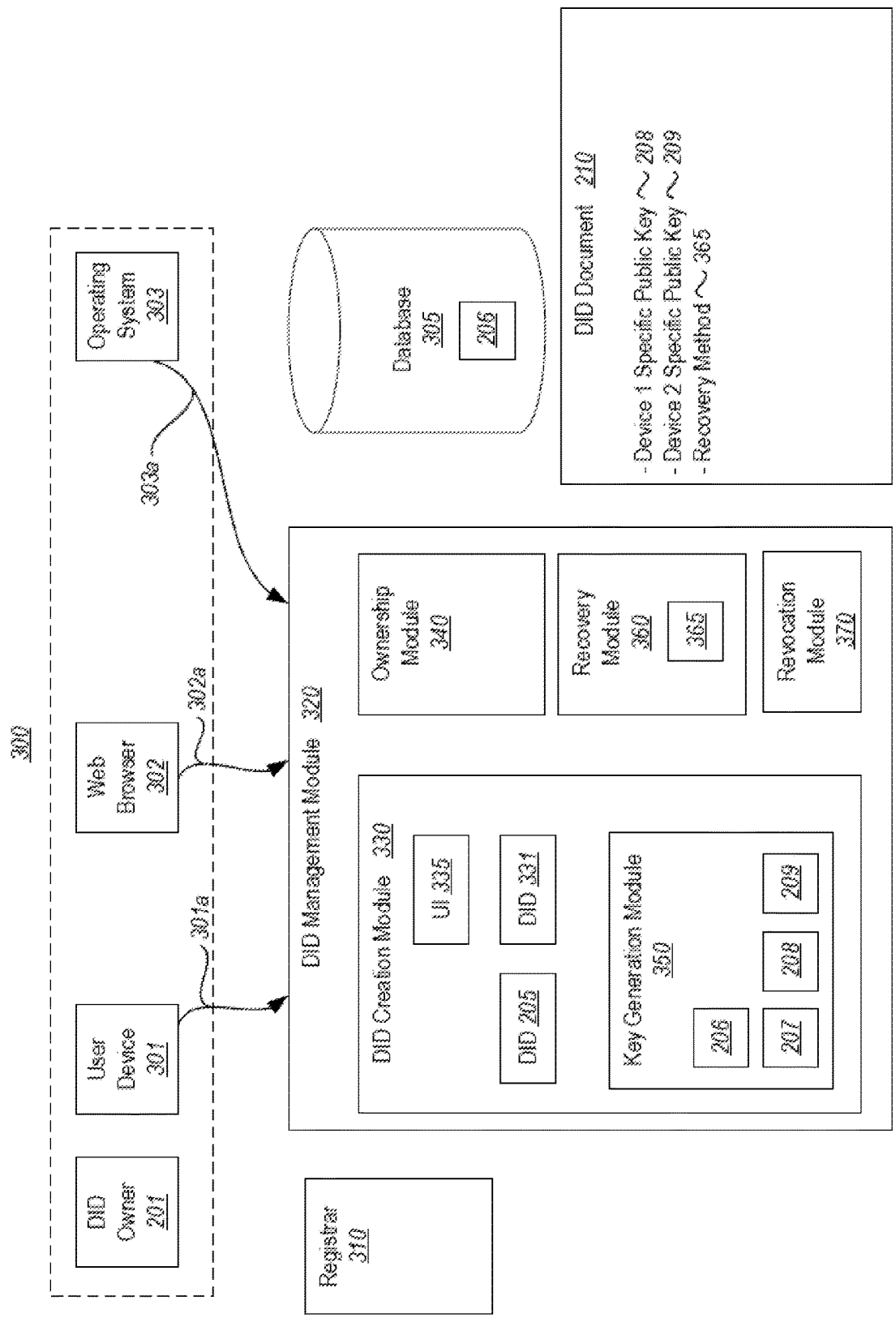
FIG. 3 illustrates an example environment for various DID lifecycle management operations and services.

Having described DIDs and how they operate generally with reference to FIG. 2, specific embodiments of DIDs will now be explained. Turning to FIG. 3, an environment 300 that may be used to perform various DID lifecycle management operations and services will now be explained. It will be appreciated that the environment of FIG. 3 may reference elements from FIG. 2 as needed for ease of explanation.

As shown in FIG. 3, the environment 300 may include various devices and computing systems that may be owned or otherwise under the control of the DID owner 21. These may include a user device 301. The user device 301 may be, but is not limited to, a mobile device such as a smart phone, a computing device such as a laptop computer, or any device such as a car or an appliance that includes computing abilities. The device 301 may include a web browser 302 operating on the device and an operating system 303 operating the device. More broadly speaking, the dashed line 304 represents that all of these devices may be owned or otherwise under the control of the DID owner 201.

The environment 300 also includes a DID lifestyle management module 320. It will be noted that in operation, the DID lifecycle management module 320 may reside on and be executed by one or more of user device 301, web browser 302, and the operating system 303 as illustrated by the lines 301a, 302a, and 303a. Accordingly, DID lifecycle management module 320 is shown as being separate for ease of explanation.

As shown in FIG. 3, the DID lifecycle management module 320 includes a DID creation module 330. The DID creation module 330 may be used by the DID owner 201 to create the DID 205 or any number of additional DIDs, such as DID 331. In one embodiment, the DID creation module may include or otherwise have access to a User Interface (UI) element 335 that may guide the DID owner 201 in creating the DID 205. The DID creation module 330 may have one or more drivers that are configured to work with specific distributed ledgers such as distributed ledger 220 so that the DID 205 complies with the underlying methods of that distributed ledger.

A specific embodiment will now be described. For example, the UI 335 may provide a prompt for the user to enter a user name or some other human recognizable name. This name may be used as a display name for the DID 205 that will be generated. As previously described, the DID 205 may be a long string of random numbers and letters and so having a human recognizable name for a display name be advantageous. The DID creation module 330 may then generate the DID 205. In the embodiments having the UI 335, the DID 205 may be shown in a listing of identities and may be associated with the human recognizable name.

The DID creation module may also include a key generation module 350. The key generation module may generate the private key 206 and public key 207 pair previously described. The DID creation module 330 may then use the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record the DID hash 231, DID hash 241, and DID hash 251 in the distributed ledger in the manner previously described and to store the DID document 210 in the manner previously described. This process may use the public key 207 in the has generation.

In some embodiments, the DID lifecycle management module 320 may include an ownership module 340. The ownership module 340 may provide mechanisms that ensure that the DID owner 201 is aware that the DID owner 201 is in sole control of the DID 205. In this way, the provider of the DID lifecycle management module 320 is able to ensure that the provider does not control the DID 205, but is only providing the management services.

As previously discussed, the key generation module 350 generates the private key 206 and public key 207 pair and the public key 207 is then recorded in the DID document 210. Accordingly, the public key 207 may be used by all devices associated with the DID owner 201 and all third parties that desire to provide services to the DID owner 201. Accordingly, when the DID owner 201 desires to associate a new device with the DID 205, the DID owner 201 may execute the DID creation module 330 on the new device. The DID creation module 330 may then use the registrar 310 to update the DID document 210 to reflect that the new device is now associated with the DID 205 and this would be reflected in an updated transaction on the distributed ledger 220 as previously described.

In some embodiments, however, it may be advantageous to have a public key per device 301 owned by the DID owner 201 as this may allow the DID owner 201 to sign with the specific device public key without having to access a general public key. In other words, since the DID owner 201 will use different devices at different times (for example using a mobile phone in one instance and then using a laptop computer in another instance) it is advantageous to have a key associated with each device to provide efficiencies in signing using the keys. Accordingly, in such embodiments the key generation module may generate additional public keys 208 and 209 when the additional devices execute the DID creation module 330. These additional public keys may be associated with private key 206 or in some instances may be paired with a new private key.

In those embodiments where the additional public keys 208 and 209 are associated with different devices, the additional public keys 208 and 209 may be recorded in the DID document 210 as being associated with those devices. This is shown in FIG. 3. It will be appreciated that the DID documents 210 may include the information previously described in relation to FIG. 2 in addition to the information shown in FIG. 3. If the DID document 210 existed prior to the device specific public keys being generated, then the DID document 210 would be updated by the creation module 330 via the registrar 310 and this would be reflected in an updated transaction on the distributed ledger 220.

In some embodiments, the DID owner 201 may desire to keep the association of a device with a public key or even with the DID 205 a secret. Accordingly, the DID creation module 330 may cause that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 may generate an additional DID, for example DID 331, for each device. The creation module would then generate private and public key pairs and DID documents for each of the devices and have them recorded on the distributed ledger 220 in the manner previously described. Such embodiments may be advantageous for devices that may change ownership as it may be possible to associate the specific device DID to the new owner of the device by granting the new owner authorization rights in the DID document and revoking such rights from the old owner.

As mentioned, the private key, to ensure that it is totally in the control of the DID owner 201, is created on the user device 301, browser 302, or operating system 303 owned or controlled by the DID owner 201 that executed the DID management module 320. In this way, there is little chance that a third party may gain control of the private key 206, especially the provider of the DID lifecycle management module 320. However, there is a chance that the device storing the private key 206 may be lost by the DID owner 201, which may cause the DID owner 201 to lose access to the DID 205. Accordingly, in some embodiments the UI 335 may include the option to allow the DID owner 201 to export the private key 206 to an off device secured database 305 that is under the control of the DID owner 201. In some embodiments, the private key 206 may be stored as a QR code that may scanned by the DID owner 201.

In other embodiments, the DID lifecycle management module 320 may include a recovery module 360 that may be used to recover a lost private key 206. In operation, the recovery module 360 allows the DID owner 201 to select one or more recovery mechanisms 365 at the time the DID 205 is created that may later be used to recover the lost private key. In those embodiments having the UI 335, the UI 335 may allow the DID owner 201 to provide required information that will be needed by the one or more recovery mechanisms 365 when the recovery mechanisms are implemented. The recovery module may then be run on any device associated with the DID 205.

The DID lifecycle management module 320 may also include a revocation module 370 that is used to revoke or sever a device from the DID 205. In operation, the revocation module may use the UI element 335, which may allow the DID owner 201 to indicate a desire to remove a device from being associated with the DID 205. In one embodiment, the revocation module may access the DID document 210 and may cause that all references to the device be removed from the DID document. Alternatively, the public key for the device may be removed. This change in the DID document 210 may then be reflected as an updated transaction on the distributed ledger 220 as previously described.

Figure 4:
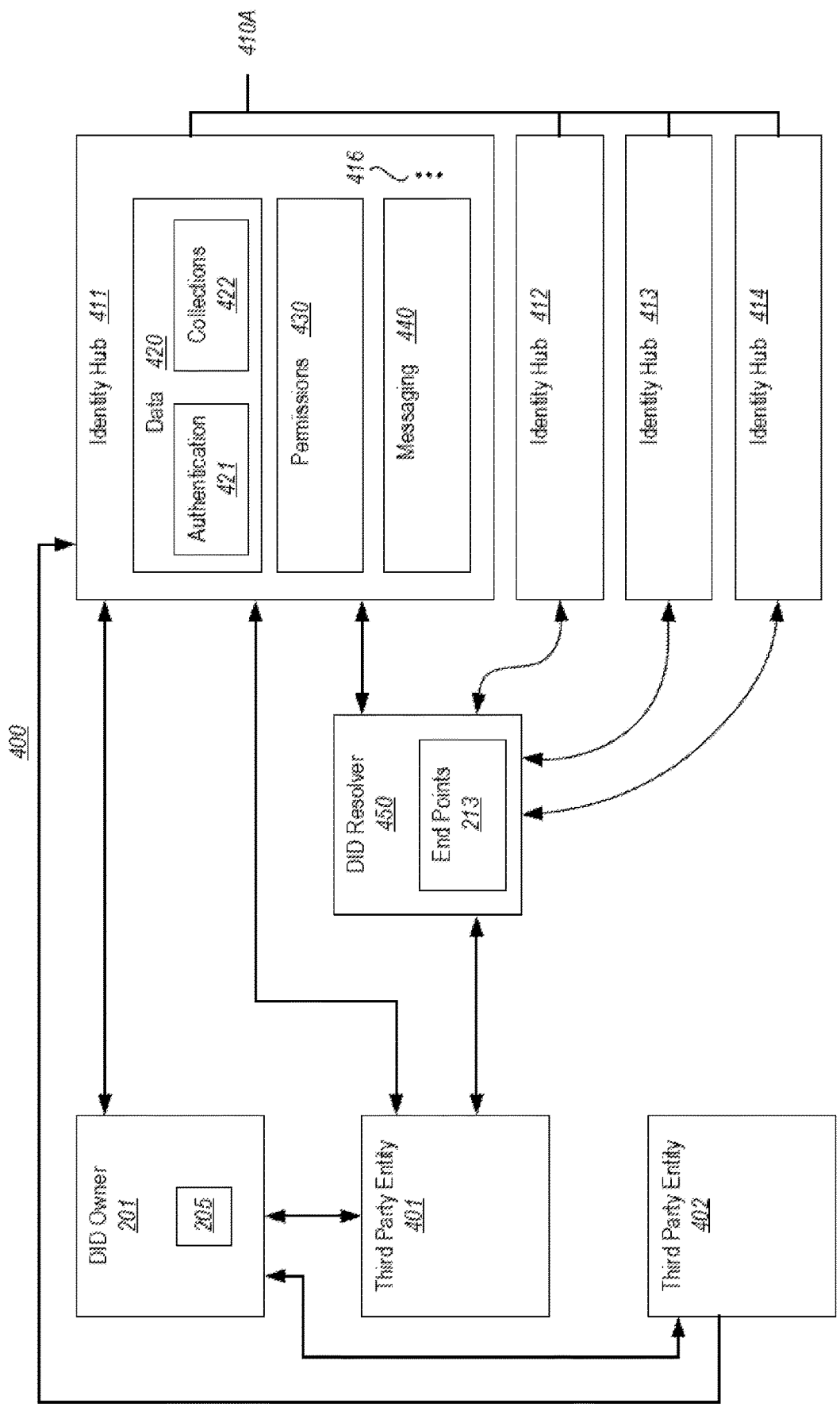
FIG. 4 illustrates an example decentralized storage device or identity hubs.

FIG. 4 illustrates an embodiment of an environment 400 in which a DID such as DID 205 may be utilized. Specifically, the environment 400 will be used to describe the use of the DID 205 in relation to one or more decentralized storage devices or identity hubs. It will be noted that FIG. 4 may include references to elements first discussed in relation to FIG. 2 or 3 and thus use the same reference numeral for ease of explanation.

In one embodiment, the identity hubs 410 may be multiple instances of the same identity hub. This is represented by the line 410A. Thus, the various identity hubs 410 may include at least some of the same data and services. Accordingly, if any change is made to one of the identity hubs 410, the change may be reflected in the remaining identity hubs. For example, the first identity hub 411 and second identity hub 412 are implemented in cloud storage and thus may be able to hold a large amount of data. Accordingly, a full set of the data may be stored in these identity hubs. However, the identity hubs 412 and 413 may have less memory space. Accordingly, in these identity hubs a descriptor of the data stored in the first and second identity hubs may be included. Alternatively, a record of changes made to the data in other identity hubs may be included. Thus, changes in one of the identity hubs 410 are either fully replicated in the other identity hubs or at least a record or descriptor of that data is recorded in the other identity hubs.

Because the identity hubs may be multiple instances of the same identity hub, only a full description of the first identity hub 411 will provided as this description may also apply to the identity hubs 412-415. As illustrated, identity hub 411 may include data storage 420. The data storage 420 may be used to store any type of data that is associated with the DID owner 201. In one embodiment the data may be a collection 422 of a specific type of data corresponding to a specific protocol. For example, the collection 422 may be medical records data that corresponds to a specific protocol for medical data. The collection 422 may be any other type of data.

In one embodiment, the stored data may have different authentication and privacy settings 421 associated with the stored data. For example, a first subset of the data may have a setting 421 that allows the data to be publicly exposed, but that does not include any authentication to the DID owner 201. This type of data may be for relatively unimportant data such as color schemes and the like. A second subset of the data may have a setting 421 that that allows the data to be publicly exposed and that includes authentication to the DID owner 201. A third subset of the data may have a setting 421 that encrypts the subset of data with the private key 206 and public key 207 pair (or some other key pair) associated with the DID owner 201. This type of data will require a party to have access to the public key 207 or to some other associated public key in order to decrypt the data. This process may also include authentication to the DID owner 201. A fourth subset of the data may have a setting 421 that restricts this data to a subset of third parties. This may require that public keys associated with the subset of third parties be used to decrypt the data. For example, the DID owner 201 may cause the setting 421 to specify that only public keys associated with friends of the DID owner 201 may decrypt this data.

In some embodiments, the identity hub 411 may have a permissions module 430 that allows the DID owner 201 to set specific authorization or permissions for third parties such as third parties 401 and 402 to access the identity hub. For example, the DID owner 201 may provide access permission to his or her spouse to all the data 420. Alternatively, the DID owner 201 may allow access to his or her doctor for any medical records. It will be appreciated that the DID owner 201 may permission to any number of third parties to access a subset of the data 420. This will be explained in more detail to follow.

The identity hub 411 may also have a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipses 416 represent that the identity hub 411 may have additional services as circumstances warrant.

In one embodiment, the DID owner 201 may wish to authenticate a new device 301 with the identity hub 411 that is already associated with the DID 205 in the manner previously described. Accordingly, the DID owner 201 may utilize the DID management module 320 associated with the new user device 301 to send a message to the identity hub 411 asserting that the new user device is associated with the DID 205 of the DID owner 201.

However, the identity hub 411 may not initially recognize the new device as being owned by the DID owner 201. Accordingly, the identity hub 411 may use the messaging module 440 to contact the DID resolver 450. The message sent to the DID resolver 450 may include the DID 205.

The DID resolver 450 may be a service, application, or module that is configured in operation to search the distributed ledger 220 for DID documents associated with DIDs.

Accordingly, in the embodiment the DID resolver 450 may search the distributed ledger 220 using the DID 205, which may result in the DID resolver 450 finding the DID document 210. The DID document 210 may then be provided to the identity hub 411.

As discussed previously, the DID document 210 may include a public key 208 or 209 that is associated with the new user device 301. To verify that the new user device is owned by the DID owner 201, the identity hub 411 may provide a cryptographic challenge to the new user device 301 using the messaging module 440. This cryptographic challenge will be structured such that only a device having access to the private key 206 will be able to successfully answer the challenge In the embodiment, since the new user device is owned by DID owner 201 and thus has access to the private key 206, the challenge may be successfully answered. The identity hub 411 may then record in the permissions 430 that the new user device 301 is able to access the data and services of the identity hub 411 and also the rest of the identity hubs 210.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 may provide the DID 205 to the third party entity 401 so that the third party may access data or services stored on the identity hub 411. For example, the DID owner 201 may be a human who is at a scientific conference who desires to allow the third party 401, who is also a human, access to his or her research data. Accordingly, the DID owner 201 may provide the DID 205 to the third party 401.

Once the third party 401 has access to the DID 205, he or she may access the DID resolver 450 to access the DID document 210. As previously discussed, the DID document 210 may include an end point 213 that is an address or pointer to the identity hub 411. The third party 401 may then use the address or pointer to access the identity hub 411.

The third party 401 may send a message to the messaging module 440 asking for permission to access the research data. The messaging module 440 may then send a message to the DID owner 201 asking if the third party 401 should be given access to the research data. Because the DID owner desires to provide access to this data, the DID owner 201 may allow permission to the third party 401 and this permission may be recorded in the permissions 430.

The messaging module 440 may then message the third party 401 informing the third party that he or she is able to access the research data. The identity hub 411 and the third party 401 may then directly communicate so that the third party may access the data. It will be noted that in many cases, it will actually be an identity hub associated with the third party 401 that communicates with the identity hub 411. However, it may a device of the third party 401 that does the communication.

Advantageously, the above described process allows the identity hub 411 and the third party 401 to communicate and to share the data without the need for the third party to access the identity hub 411 in the conventional manner. Rather, the communication is provisioned in the decentralized manner using the DID 205 and the DID document 210. This advantageously allows the DID owner to be in full control of the process.

As shown in FIG. 4, the third party 402 may also request permission for access to the identity hub 411 using the DID 205 and the DID document 210.

Accordingly, the embodiments disclosed herein allow access to any number of third parties to the identity hubs 210.

Figure 5:
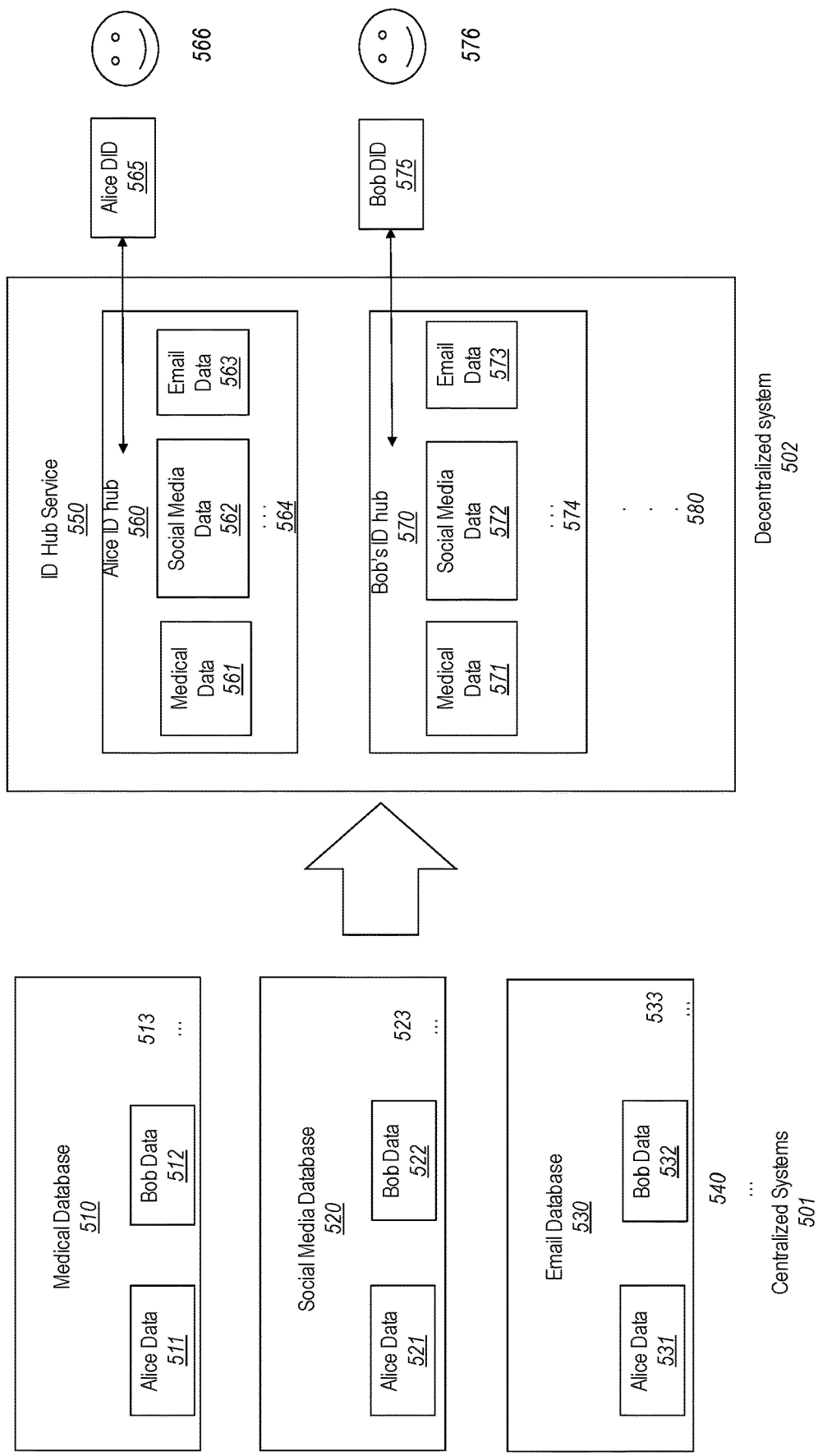
FIG. 5 illustrates an overview comparison between a centralized data system and a decentralized data system.

Having described an example environment for creating a DID and an example environment for various DID lifecycle management operations and services, we will make a simplified comparison between a "centralized" data system and a "decentralized" data system (that implements DIDs) with respect to FIG. 5.

The left side of FIG. 5 illustrates one or more centralized data systems 501. A "centralized data system" referred herein is a database or data system that is stored and maintained by a centralized organization. The database or data system may be located in a single location as a true "centralized" data system, or it may be a distributed database that includes multiple database files located in different locations. However, no matter whether the data system is located in a single location or multiple locations, as long as the data system is stored and maintained by a centralized organization, such a data system is herein referred to as "centralized data system."

Most of the existing data systems are centralized. For example, as illustrated in FIG. 5, the medical database 510 is an example centralized database. The medical database 510 may be stored and maintained by a hospital, a clinic office, and/or a data service provider. The medical database 510 includes Alice's data 511 and Bob's data 512. The ellipsis 513 represents that there may be records of any number of patients being stored in the medical database 510. Currently, even though the laws may require health service providers to make medical data be available to the respective patient, each patient normally does not have constant access to his/her own medical data. A patient usually needs to submit a written request or request in person, if he/she wants to review his/her complete medical history.

Additionally, the social media database 520 and the email database 530 are also examples of centralized data systems. For instance, the social media company (e.g., Facebook) maintains its own database 520 that may include each of the users' personal information, the corresponding user generated contents, communications between the corresponding user and other users, etc. As illustrated in FIG. 5, the social media database 520 may include a record of Alice (i.e., Alice data 521) and a record of Bob (i.e., Bob data 522). The record of Alice 521 may include Alice's personal information that she entered in the settings, her friends' IDs, the message Alice has posted, the ads Alice has clicked, etc. Similarly, the record of Bob 522 may include similar types of information that is associated with Bob's social media account. The ellipsis 523 represents that there may be any number of user records stored in the social media database 520 that is controlled and maintained by the social media service provider. Even though in this case each of the social media account holders generally has access to his/her own account information, the social media service provider has real control over all the data. For example, if the social media service provider's server is down or the hard drive is crashed, the users may lose connection or even lose their data. Another example, if the social media service's server is hacked, the users' information may be lost even without the users' knowledge.

Also similarly, the email database 530 is another example of a centralized data system. The email database 530 is controlled and maintained by the email service provider (e.g., outlook.com, gmail.com, etc.). Most of the existing service providers maintain its own email server, and each user must register an account with the email server to obtain an email account. Once an email account is registered, it is stored on the server that is maintained by the service provider. For example, as illustrated in FIG. 5, the email database 530 hosted by an email server may include Alice's email account data 531 and Bob's email account data 532. The ellipsis 533 represents that there may be any number of email account records stored in the email database 530. Alice's email account data 531 may include her personal information she entered when registering the email account. Alice's email data 531 may also include all the emails she received and sent using the email account. Similarly, Bob's email account data 432 may include similar information related to Bob's email account. If the email server is down, the users would not be able to receive or send emails, and also not able to retrieve his/her email history unless a local copy is stored on the user's own device. The email server may also be vulnerable to cyber-attacks. When such an attack occurs, users also often do not aware that their information has been compromised.

The right side of FIG. 5 illustrates a simplified decentralized system 502 that provides a personal storage for each DID owner in an ID hub service 550. The personal storage in the ID hub service 550 is controlled by the DID owner, instead of the centralized organization. For example, as illustrated in FIG. 5, the ID Hub 550 includes Alice's ID hub 560 (i.e., Alice's personal storage) and Bob's ID hub 570 (i.e., Bob's personal storage). The ellipsis 580 represents that there may be any number of personal storages, each of which is associated with a DID (or a DID owner).

The personal storage of Alice 560 includes Alice's medical data 561, Alice's social media data 562, and Alice's email data 563. The ellipsis 564 represents that there may be other types of Alice's personal data stored in Alice's personal storage 560 in the ID hub service 550. Similarly, Bob's personal storage 570 stores Bob's medical data 571, Bob's social media data 572, and Bob's email data 573. The ellipsis 574 represents that there may be other types of Bob's personal data stored in Bob's personal storage 570 in the ID hub service 550.

In the decentralized system 502, each DID owner has great control over his/her own personal data via his/her DID. For example, Alice 566 has control over the personal storage 560 via her DID 565; and Bob 576 has control over his personal storage 570 via his DID 575. No single centralized entity has access to all the users' information and data without each user's consent. Theoretically, as long as the user stores his/her DID (or the private key of his/her DID) securely, no one else could compromise the data stored in the ID hub. Comparing to the centralized systems 501 on the left, it is clear that unlike the centralized systems 501, where each of the centralized organizations maintains and controls every user's data, the decentralized system 502 allows each of the users (e.g., DID owners) to store and control his/her own data individually. A user (e.g., a DID owner) can decide whether the data should be made public and/or who can have access to the data; and the user can also decide whether he/she wants to delete or make any change of any portion of the data.

As described above, decentralized systems generally give users (e.g., DID owners) a great control over their data; and in such a decentralized system, centralized organizations generally no longer have control over each user's data. However, governments and organizations often have laws and/or rules to regulate certain types of data. The principles described herein will allow such laws and/or rules to be implemented in decentralized systems, such that even though the users (e.g., DID owners) still have great control over their own data, the laws and rules may still be enforced.

Figure 6:
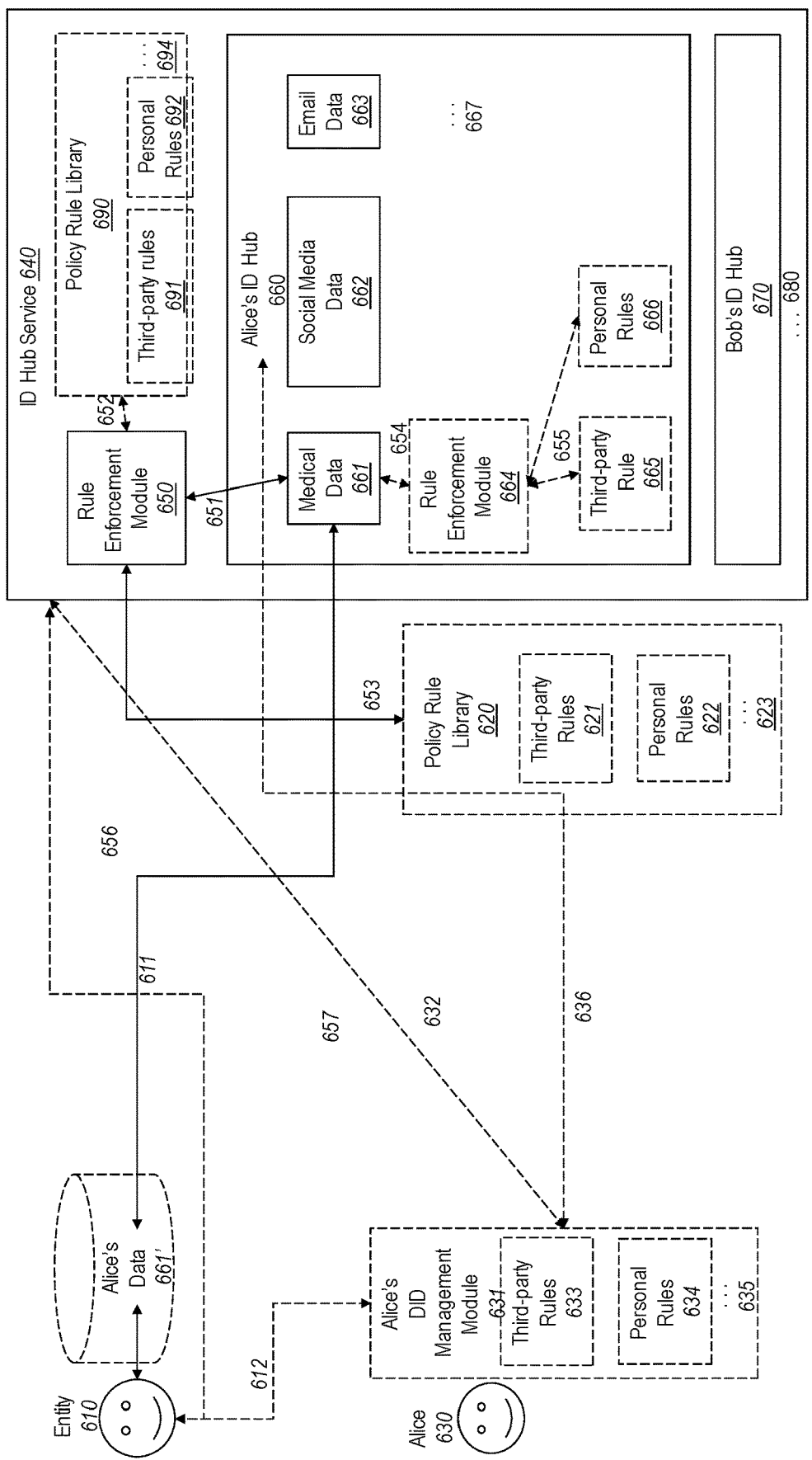
FIG. 6 illustrates an example embodiment for enforcing one or more policy rules that are applicable to a type of data.

FIG. 6 illustrates an example embodiment in a decentralized environment 600 for enforcing one or more policy rules that are applicable to a type of data. As illustrated in FIG. 6, the ID hub service 640 may be similar to the ID hub service 550 of FIG. 5. The ID hub service 640 may be a cloud service that provides personal storages for multiple DID owners (e.g., Alice and Bob). The ellipsis 680 represents that the ID hub service 640 may store any number of DID owners' personal data. Alice's personal data is stored in Alice's ID hub 660 (i.e., Alice's personal storage) in the ID hub service 640. Bob's personal data is stored in Bob's ID hub 670 (i.e., Bob's personal storage) in the ID hub service 640.

Alice's personal storage 660 may store many different types of personal data, such as Alice's medical data 661, social media data 662, email data 663, etc. The ellipsis 667 represents that there may be other types of Alice's personal data stored in Alice's personal storage 660. Similar to the system illustrated in FIGS. 3, 4 and 5, Alice 630 has great control over her personal data 661-663 via a DID management module 631. The DID management module 631 may be similar to the DID management module 320 as illustrated in FIG. 3. For example, the DID management module 631 may be implemented on Alice's mobile device (e.g., a cell phone) and/or a personal computer.

When an entity 610 requests to access Alice's personal storage 660 in the ID hub service 640 to operate on data stored or to be stored in the storage 660, the ID hub service 640 and/or Alice's ID hub 660 may receive the request directly from the entity 610's device (e.g., a computing system). In some embodiments, the entity 610 may send the request to Alice's DID management module 631 directly, and in response to the request, Alice's DID management module 631 may then send a notification to the ID hub service 640 and/or Alice's ID hub 660. Each of the dashed arrow lines 611, 612, 632, and 636 represents a communication channel between the modules and/or devices. Anyone or more of these communication channels (611, 612, 632, and 636) may be implemented for the ID hub service 640 or the DID owner's ID hub (e.g., Alice's ID hub 660) to receive a notification of data request from the entity 610.

The request should include sufficient DID information, such that based on the request, the ID hub service 640 can identify the ID hub (i.e., the storage) associated with the DID and the requested data. For example, when the entity 610 requests to access Alice's medical data 611, the request should include information related to Alice's DID, and also include the information related to the specific data being requested. Based on the information related to Alice's DID, the ID hub service 640 can identify that the request is directed to Alice's ID hub 660. Based on the information related to the specific data being requested, the ID hub service 640 can then identify the particular data being requested. In some embodiments and/or in some requests, the information related to the specific data may indicate what type of data is being requested. In some embodiments and/or in some requests, the information related to the specific data may include an address of a particular piece of data that is being requested.

Based on the request, the ID hub service 640 may determine what type of data is being requested. If the request includes information indicating what type of data is being requested, the ID hub service 640 may use the data-type information received. If the request does not include information indicating what type of data is being requested, the ID hub service 640 may identify the specific location where the requested data is stored, and analyze the requested data to determine what type of data is requested. The data stored in the DID owner's ID hub is likely encrypted, thus, the complete information of the data may not be obtained by the ID hub service 640. However, the metadata of the requested data is not necessarily encrypted. In some embodiments, the metadata of the requested data may be analyzed to determine the type of data.

As briefly mentioned earlier, there may be government and/or organization rules that regulate different types of personal data. To make sure these government and/or organization rules are enforced properly, a rule enforcement module 650 and/or 664 may be implemented in the ID hub service 640 and/or in the DID owner's personal storage (e.g., Alice's ID hub 660). The rule enforcement modules 650 and/or 664 have access to many or all of the government and/or organization rules, and their function is to make sure that certain data operations will not be permitted even though the DID owner wants such data operations to be performed.

After the determination of the type of data, one or more applicable policy rules may be accessed by the rule enforcement modules 650 and/or 664. The policy rules may be stored in a policy rule library 620. The policy rule library 620 may be a cloud-based service that stores many available policy rules 621-623. The ellipsis 623 represents that there may be any number of policy rules stored in the policy rule library. The policy rule library 620 may include many third-party rules 621, such as different governments' rules that are applicable to different types of personal data. The third-party rules 621 may also include different organizations' rules that are applicable to data that are relevant to the respective organizations. The policy rule library 620 may also include personal rules 622 that are set by some of the DID owners. The personal rules may be stored with an address (or link) pointing to the DID owner's personal storage 660 or pointing to the DID management module 631, or be stored with an identification that can be traced to a DID. The ellipsis 623 represents that there may be other types of rules that do not fall into the third-party rules 621 or personal rules 622. For example, some rules set by one DID owner may affect data accesses by another DID owner.

Alternatively or in addition, at least some of the policy rules may be stored in the DID management module 631. For example, Alice's DID management module 631 may store some of the third-party rules 633 that are relevant to Alice's personal data. Alice's DID management module 631 may also store part or all of Alice's personal rules 634. Alternatively or in addition, at least some of the policy rules may be stored in Alice's personal storage (i.e., Alice's ID hub 660) and/or in a common storage area in the ID hub service 640 where each of the DID owners or the DID owner's personal storage has access.

The dashed lines represent that it is not necessary that only one of the above-mentioned storages may store all or part of the policy rules. More than one storage may store policy rules at the same time. For example, in some embodiments, the policy rule library 620 may store a large collection of rules that are accessible by multiple ID hubs or different DID management modules provided by different DID system providers. In some embodiments, the policy rule library 620 may not store any personal rules at all. In some embodiments, the complete policy rule library 690 may be implemented in the ID hub service 640. In some embodiments, the DID hub service 640 may store a subset of the rules that are applicable to the DID owners' data that are stored in the particular DID hub service 640. A DID owner's personal storage (e.g., Alice's ID hub 660) and/or the respective DID management module (e.g., Alice's DID management module 631) may only store her personal rules and/or only the third-party rules that are applicable to her own data.

In some embodiments, the policy rule library 620 may allow each of the rule setters (e.g., government entities and/or organizations) to input and update their own rules. In some embodiments, the policy rule library 620 may periodically reach out to each of the third-party rule setters to inquire whether the existing rules have been changed. If the rules are changed, the service provider of the policy rule library 620 may update the rules manually or automatically. The third-party rules 631 stored in Alice's DID management module 631, Alice's personal storage 660, and/or the ID hub service 640 may also be updated regularly. These updates may be based on the updates in the policy rule library 620 or be directly triggered by the rule setters' notifications.

Furthermore, it is not necessary that the third-party rules be stored in at least one of the above-mentioned storages. Each of the rule setters (e.g., government entities or organizations) may maintain its own rules on its own webpage or server. The policy rule library 620 may only include a list of links (e.g., URLs) each of which links to a respective government or organization's rule server. Alternatively, the list of the links may be stored in Alice's DID management module 640, Alice's personal storage 660, and/or the ID hub service 640. The DID owner's DID management module 631, personal storage 660, and/or the ID hub service 640 may communicate with each of the rule setters' servers directly to obtain applicable rules.

For example, in some embodiments, the rule enforcement module 650 and/or 664 may access more than one storage substantially simultaneously. In some embodiments, the rule enforcement module 650 and/or 664 may access the local storage and/or Alice's personal storage first and see if there is any applicable third-party rules or personal rules for medical data. In case that there is no applicable rules stored in the management module 630, the rule enforcement module 650 and/or 664 may then access the policy rule library 620 to see if there are additional rules that may be applicable.

Based on the one or more applicable policy rules, the rule enforcement modules 650 and/or 664 implemented in the ID hub service 640 and/or Alice's ID hub 660 may then determine if the operation on Alice's data will result in the data complying with the one or more applicable policy rules. The rule enforcement module 650 may be implemented in the ID hub service 640 for enforcing rules that are applicable to data stored in many DID owner's ID hubs. Alternatively or in addition, a rule enforcement module 664 may be implemented in each DID owner's ID hub, or configured to enforce rules applicable to data stored in the corresponding DID owner's ID hub. For example, Alice's ID hub 660 may have a designated rule enforcement module 664 for enforcing rules that are applicable to Alice's personal data, and Bob's ID hub 670 may have another designated rule enforcement module (not shown) for enforcing rules that are applicable to Bob's personal data. The dashed line 664 represents that the rule enforcement module 664 may not necessarily stored in Alice's ID hub 660. It may be a sub-module of the rule enforcement module 650. The rule enforcement module 650 may include multiple sub-modules, each of which is designated to enforce rules for data stored in one or more DID owner's personal storage (e.g., Alice's ID hub 660, Bob's ID hub 670).

Further, in addition to data types, other factors may also be considered in determining whether there are any applicable rules, such as the information related to the requesting entity 610 and/or the DID owner, and/or the location of the parties (e.g., the location of the DID owner, the location of the ID hub, the location of the requesting entity 610, etc.). For example, the entity 610 may be a medical doctor located in the U.S. The medical doctor 610 may request to enter Alice's medical data 661 in Alice's personal storage 660.

When the ID hub service 640 and/or Alice's personal storage 660 receives the request from the entity 610 (e.g., the medical doctor), the rule enforcement module 650 and/or 664 determines a set of policy rules that are applicable to medical data. However, each country may have a different set of rules that regulate the handling of medical data. the rule enforcement module 650 and/or 664 may further filter all the policy rules that are applicable to medical data based on the location of the medical doctor and the location of the DID owner. For example, if both the medical doctor and the DID owner are located in the U.S., only the U.S. rules will be applicable. Further, based on the hospital or clinic that the medical doctor 610 works for, there may be additional rules set by the hospital or clinic that are applicable here.

In addition to the third-party rules, the rule enforcement module 650 and/or 664 may further access Alice's personal rules 622, 634, 666, and/or 692. Alice 630 may have set more rules to limit the access of her medical data 661. If Alice's personal rules are stricter than the third-party rules (e.g., government rules or hospital rules) that are applicable to Alice's medical data, the rule enforcement module 650 and/or 664 may allow Alice's personal rules 632 to overwrite the third-party rules. However, if Alice's personal rules are less strict than the third-party rules, the rule enforcement module 650 and/or 664 may decide to ignore Alice's personal rules and apply the third-party rules.

When the rule enforcement modules 650 and/or 644 determines whether to grant or deny the request, a notification may be sent to the requesting entity 610 and/or Alice 630. In some cases, a notification may also be sent to a third party that is related to the requesting entity and/or the DID owner.

For example, the entity 610 may be Alice's potential employer. Alice's potential employer 610 may request to access Alice's social media data 662 stored in Alice's personal storage 660. The ID hub service 640 or Alice's personal storage 660 receives the request from Alice's employer 610 and sends a notification to Alice's DID management module 631. Alice's DID management module 631 will then determine what type of data is requested. In this case, the data type is social media data. Based on this determination, Alice's DID management module 631 accesses one or more policy rules that may be applicable to social media data.

There may not be any government rules regulating access to social media data, but the social media service provider may have set some rules. The social media service provider may require the account owner's expressly consent to allow a third party to access a user's social media content. If Alice 630 has not set a personal rule to consent the potential employer's request, such a request may be automatically denied. After the request is denied, the rule enforcement modules 650 and/or 664 may then send a notification to Alice to inform her that her potential employer has requested to access her social media data 662, but the request has been denied. Once the request is denied, the rule enforcement modules 650 and/or 664 may send a notification to Alice's potential employer, such that the employer gets to know that the requested data is not accessible. The rule enforcement modules 650 and/or 664 may also send a notification to Alice herself, such that Alice knows that her potential employer has tried to access her personal data.

Another example, Alice may be a minor. A third party has requested to access Alice's medical data 661, and Alice may have granted permission to the third party to access her medical data 661. However, the rule enforcement modules 650 and/or 664 may detect a rule related to medical data that requires a parental consent for a minor's medical record to be released to a third party. Thus, even though Alice has granted such permission to the third party, the rule enforcement modules 650 and/or 664 will ignore Alice's consent and still deny the request. Once the request is denied, a notification may be sent to the third party 610 who requested Alice's medical data 661. The notification may include the particular reason why the request was denied, i.e., Alice is a minor, thus, she is not competent to consent. A notification may also be sent to Alice and her parents. Each of Alice's parents may be another DID owner. In such a case, a notification may be sent to each of Alice's parent's DID management module. Alternatively or in addition, notifications may be sent as emails, SMSs, automatic phone calls, etc.

In some embodiments, the rule enforcement module 650 and/or 664 may only need to access the policy rule library 620 when it is a first time that a type of data is requested to be entered or accessed. Thereafter, the rule enforcement module 650 and/or 664 may store the accessed relevant rules in the ID hub service 640, in Alice's ID hub 660 and/or in the DID management module 631. The rules that are applicable to a particular type of data may be stored with that particular type of data in the DID owner's personal storage (i.e., the DID owner's ID hub). For example, the rules applicable to medical data may be stored with Alice's medical data 661. When Alice's medical data is accessed a second time, the rule enforcement module 650 and/or 664 will be able to quickly retrieve and apply the rules stored in Alice's personal storage 660.

The policy rule library 620 may be periodically updated by the cloud service provider to maintain current governments and/or organizations' rules. As briefly mentioned above, the cloud service provider may also grant permission to each of the government or organization entities, such that these entities can update the rule by themselves. Once the rules in the policy rule library 620 are updated, the policy rule library 620 may notify the ID hub services 640, at least some DID owner's ID hub 660 and 670, and/or at least some DID owner's DID management module 631 to update the rules stored in each of these storages. Alternatively, the ID hub service 640, at least some DID owner's ID hubs 660 and 670, and/or at least some DID owner's DID management module 631 may periodically access the policy rule library 620 to check whether the rules have been updated.

Further, after a data operation is completed, the ID hub service 640 and/or Alice's ID hub 660 may generate a notification to show whether the data operation was successful or failed or a summary of what has happened to the data requested. The notification may be based on the DID owner's choices. The notification may be sent to the DID owner's DID management module 631. The notification may also be sent via any other communication channels, such as email, SMS, automatic phone call, etc. The DID owner may choose what notification channel(s) he/she would like to receive notifications.

The DID owners may choose not to receive any notifications. Alternatively, the DID owners may choose to receive a notification only under certain circumstances. For example, Alice may choose to receive a notification only when her medical data 661 is updated. In some embodiments, the DID owners may choose to receive a simple notification or a complex notification. For example, Alice may choose to receive a notification to indicate that some of her data has been accessed by others, but choose not to receive any notification when her social media data is accessed by someone. Alternatively, Alice may choose to receive a comprehensive notification that includes more information. For example, when Alice's family doctor entered a new record in Alice's medical data 661, the notification may show the date and time of the new record was entered, the size of the new entry, even the detail of the new record, etc.

Additionally, in some embodiments, when one DID owner's data is operated on, another DID owner may be notified. For example, if Alice is a minor, when Alice's social media data is accessed, even though such access does not violate any rules, her parents may receive a notification from the parents' DID management modules and/or via any other communication channels.

In some embodiments, the entity 610 may also be an owner of a DID. The entity 610's DID document may include information that is related to the DID owner and/or the DID owner's relationship with Alice. For example, the entity 610's DID may indicate that the entity 610 is Alice's current family doctor. In such a case, even though one or more rules are applicable to Alice's medical data, applying the rules may still allow entity 610 to read and update Alice's medical data 661. Each time, Alice visits her family doctor 610, the family doctor 610 will update her medical data 661 stored in her personal storage 660. Each of these data transactions may then be recorded in a blockchain. The blockchain for medical data may be a private blockchain. Alternatively, a public blockchain, which does not record information that can be easily traced to a particular individual, may be implemented.

Another example, the entity 610 may even be Alice 630 herself. When Alice 630 requests to access her own medical data 661, there may be certain applicable rules too. For example, she probably should not be allowed to modify the medical data 661, even though it is stored in her personal storage 660. If Alice 630 requests to update her medical data 661, the rule enforcement module 650 and/or 664 may apply a rule that prohibits anyone who is not a medical doctor to modify any medical data and deny her request for modifying her own medical data 661.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
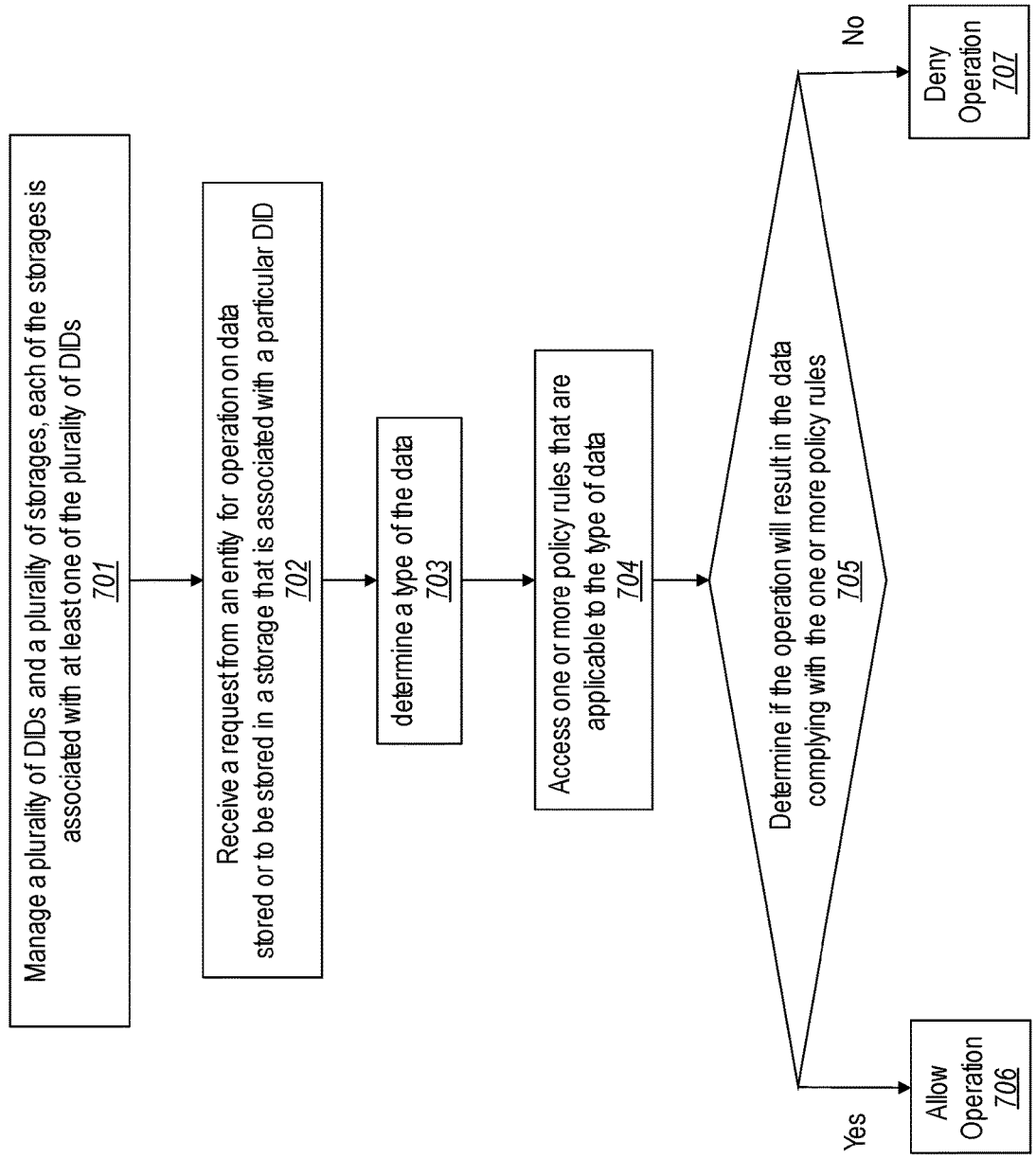
FIG. 7 illustrates a flow chart of an example method for enforcing one or more policy rules that are applicable to a type of data.

FIG. 7 illustrates a flow chart of an example method 700 for enforcing one or more policy rules that are applicable to a type of data. The method 700 will be described with respect to one or more of the FIGS. 2-6 discussed previously.

The method 700 includes managing a plurality of DIDs and a plurality of storages, each of the storages is associated with at least one of the plurality of DIDs (701). The plurality storages may be ID hubs 660 and 670 that are managed by an ID hub service 640. The method 700 further includes receiving a request from an entity for operation on data stored or to be stored in a storage that is associated with an owner of DID (702). The entity may be the entity 610 illustrated in FIG. 6. Data stored in a storage that is associated with an owner of DID may be Alice's medical data 661, social media data 662, and/or email data 663 that are stored in Alice's personal storage 660, as illustrated in FIG. 6. After the entity requests for the operation on the data, the request from the requesting entity may be received directly by the ID hub service 640 and/or Alice's ID hub 660 (702). Alternatively, the request may be sent to Alice's DID management module 631. Thereafter, Alice's DID management module 631 sends a notification of the request to the ID hub service 640 and/or Alice's ID hub 660.

After receiving the request, the type of the requested data is determined (703). Based on the determined type of the data, one or more policy rules that are applicable to the type of data are accessed (704). Thereafter, the one or more applicable rules will be applied to the requested data, such that a decision can be made of whether the operation will result in the data complying with the one or more policy rules (705). If the operation will result in the data complying with the one or more policy rules, the operation is allowed (706). If the operation will not result in the data complying with the one or more policy rules, the operation is denied (707).

Figure 8:
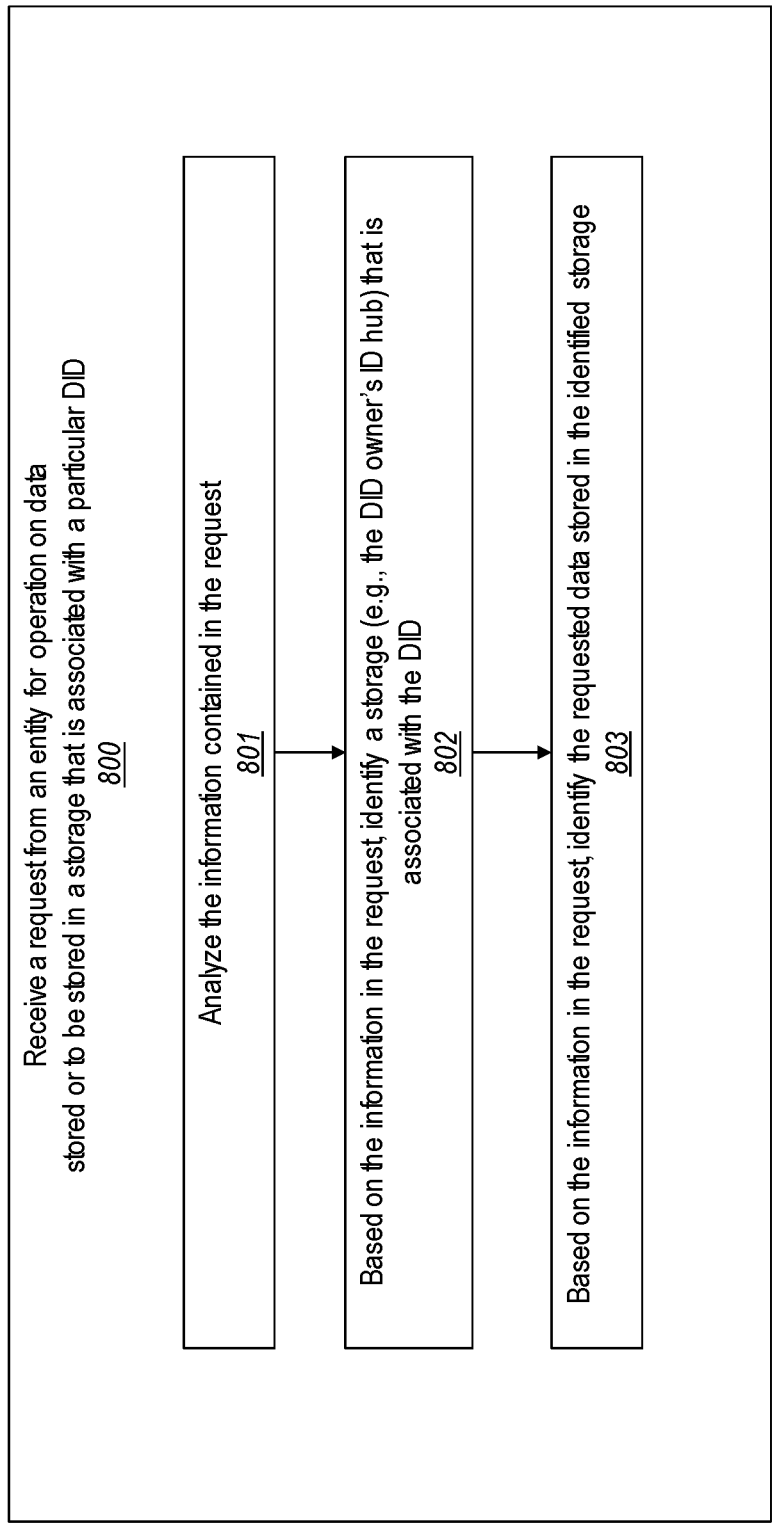
FIG. 8 illustrates a flow chart of an example method for receiving a request from an entity for operation on data stored or to be stored in a storage that is associated with a DID.

FIG. 8 illustrates a flow chart of an example method 800 for receiving a request from an entity for operation on data stored or to be stored in a storage that is associated with a particular DID, which may correspond to an embodiment of step 702 of method 700. The method 800 may include analyzing the information contained in the request (801). The information may include information related to the particular DID. Based on the information related to the particular DID, a storage (e.g., Alice's ID hub 660) that is associated with the particular DID is identified (802). The information may also include information related to the specific data that is being requested. Based on the information related to the specific data that is being requested, the requested data in the identified storage (e.g., Alice's medical data 661 stored in her ID hub) is then identified.

Figure 9:
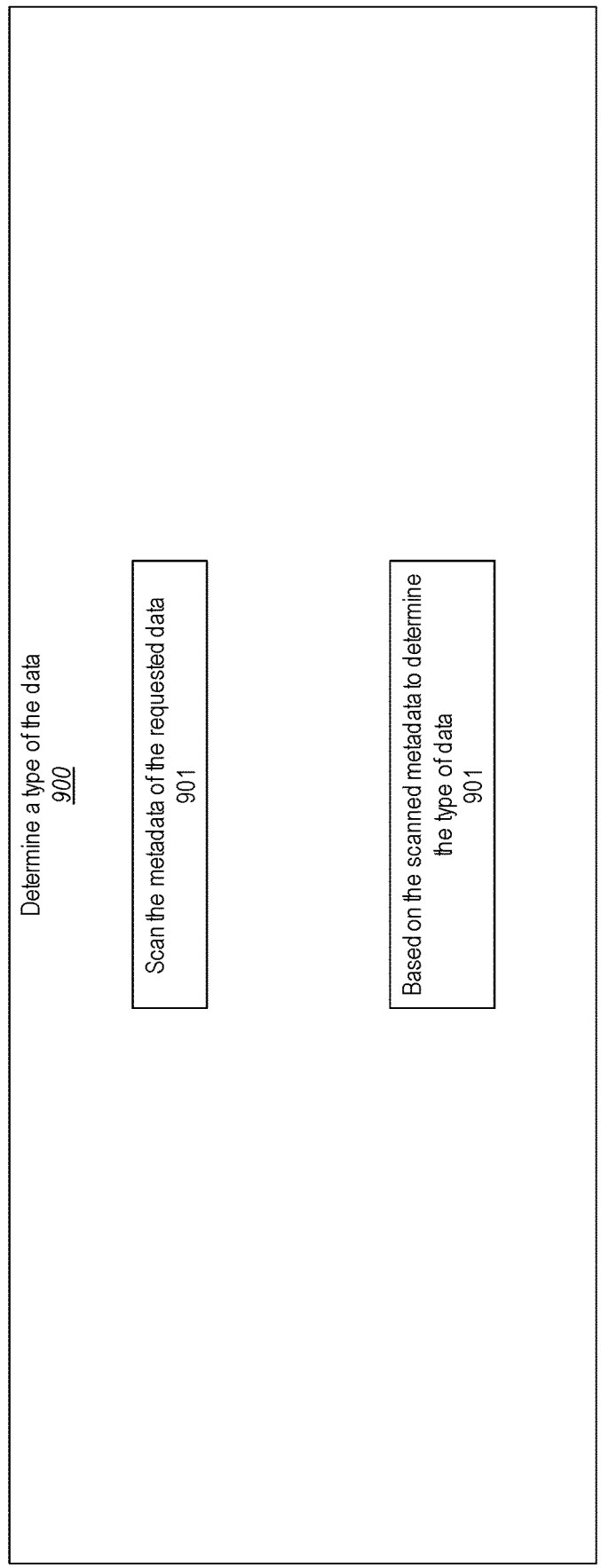

FIG. 9 illustrates a flow chart of an example method 900 for determining a type of the data that is requested to be operated on, which may correspond to an embodiment of step 703 of method 700. The method 900 may include scanning the metadata of the data of the requested data (901). Based on the scanned metadata of the data, determining a type of the requested data (902). Because the data stored in the DID owner's personal storage (e.g., DID owner's ID hub) is likely to be encrypted, it may not be able to determine exactly what the requested data is. However, the metadata is not necessarily encrypted, and the metadata may include information related to the types of data. In some embodiments, the system may implement a file format, such that when a new file is generated, at least one type of the data is required to be specified in the metadata. In some embodiments, only certain types of data are required to specify its types in the metadata, such as medical data, government ID related data, criminal history, credit history, etc.

Figure 10:
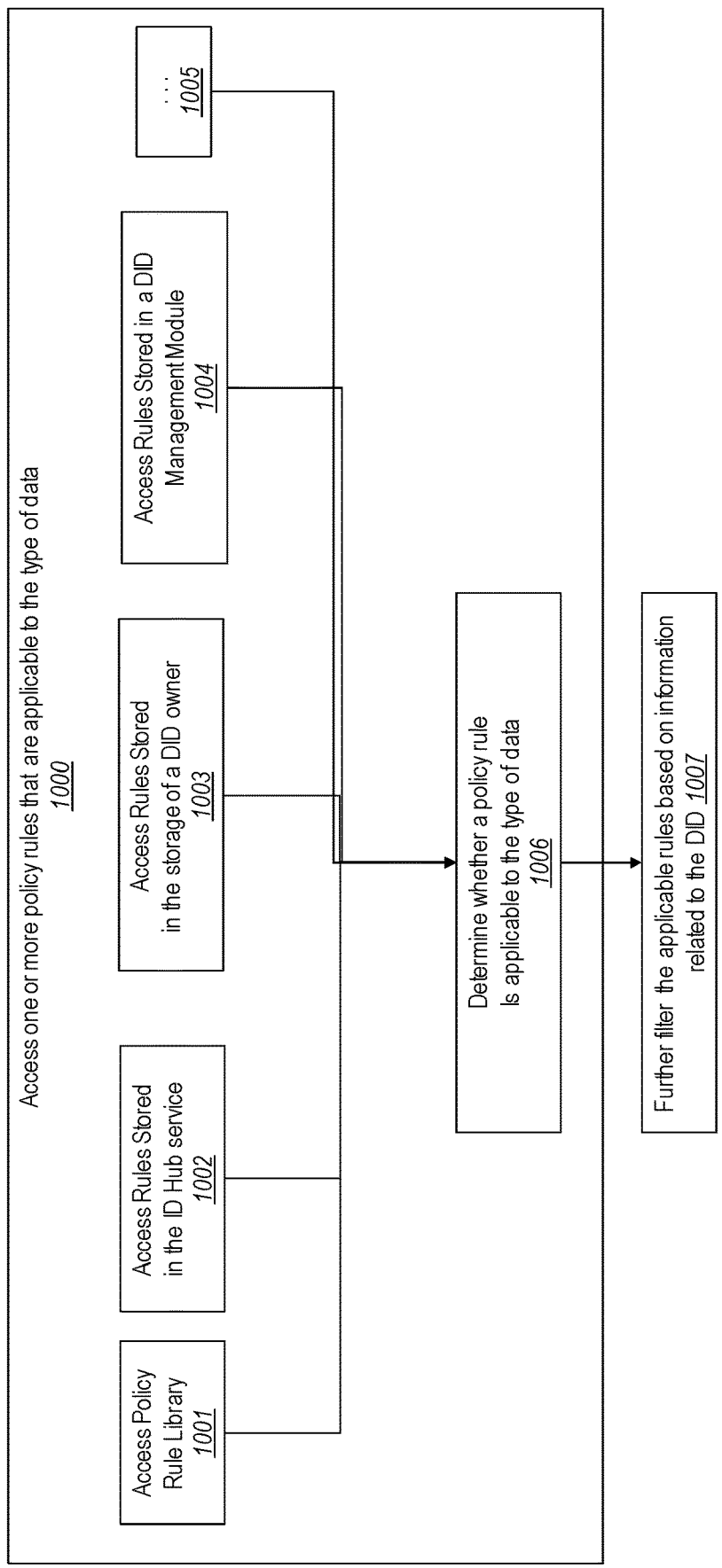
FIG. 10 illustrates a flow chart of an example method for accessing one or more policy rules that are applicable to the type of data.

FIG. 10 illustrates a flow chart of an example method 1000 for accessing one or more policy rules that are applicable to the type of data, which may correspond to an embodiment of step 704 of method 700. After the type of the data is determined, one or more policy rules may be accessed (1001, 1002, 1003, 1004, and/or 1005). In some embodiments, policy rules may be stored in a policy rule library 620, thus, the policy rule library is accessed (1001). In some embodiments, the policy rules may be stored in the ID hub service 640 where each of the DID owner's storages has access, thus, the ID hub service 640 is accessed (1002). In some embodiments, the policy rules may be stored in the personal storage of the DID owner (e.g., Alice's ID hub 660), thus, the personal storage of the DID owner is accessed (1003). In some embodiments, the policy rules may be stored in the DID management module (e.g., Alice's DID management module 631), thus, the DID management module is accessed (1004). It is not necessary that the policy rules are stored in only one place. For example, the policy rules may be stored in the policy rule library 620 and also in the ID hub service 640, and either one of the storages or both of the storages may be accessed.

Each of the storages may be accessed substantially simultaneously or sequentially in order. For example, in some embodiments, the policy rules stored locally in Alice's ID hub 660 may be accessed first (1004). If there is no applicable rules found in the Alice's ID hub 660, the policy rules stored in the ID hub service 640 may then be accessed (1002). If there is still no applicable rules found in the ID hub service 640, the policy rule library 620 may then be accessed (1001). In some embodiments, the personal rules 622, 634, 666, and/or 692 may be accessed first, then the third-party rules 621, 633, 665, and/or 691 may be accessed, or vice versa.

The ellipsis 1005 represents that it is also possible that the policy rules are stored in some other storage. For example, some of the policy rules may be stored in the government or organization's website or server, and only the addresses or links of the policy rules may be stored in the policy rule library, the ID hub, storage of the DID owner, and/or the DID management module. In such an embodiment, there are less needs to update the policy rule library unless the links of the policy rules have changed. However, each time a policy rule is accessed, the system may need to access a remote server, which may take additional network bandwidth, other resources, and/or time to complete the process.

Additionally, the method 1000 includes determining whether one or more policy rules are applicable to the type of data determined (1006). The method 1000 may further includes filtering the applicable rules based on additional information including, but not limited to, the information related to the DID owner, the data requesting entity, and/or data generating entity (1007).

The policy rule library accessed in step 1002 is intended to include a large set of policy rules that are applicable to different types of data. When the policy rule library is accessed, the large number of policy rules may first be filtered based on data type, and only the rules that are applicable to the data type are sent to the rule enforcement modules 650 and/or 664. However, in some cases, the policy rules that are applicable to the type of data may still include too many rules. For example, it is possible that each country and/or state has slightly different rules regarding medical data. In such a case, applying all the rules related to medical data to a particular DID owner's medical data would be unnecessary. Thus, the policy rules that are applicable to the type of data may be further filtered to fit the particular DID owner's data based on additional information. For example, the rules applicable to medical data may be further filtered based on the geographic location of the DID owner, the geographic location of the data, the geographic location of the requesting entity, and/or the geographic location of the entity that generated the data (e.g., medical doctor's location).

In some embodiments, the policy rules may further be filtered based on the DID owner's other information, the information of the entity that generated or updated the data, and/or the information of the requesting entity. For example, the entity that requests the data may be a government employer of the DID owner. The data requested may be the result of a random drug test that was ordered by the government employer. In such a case, there may be a special policy rule to allow the government employer to access the random drug test results, even though the drug test results generally fall into the type of the medical data, which is generally not accessible by employers.

Figure 11:
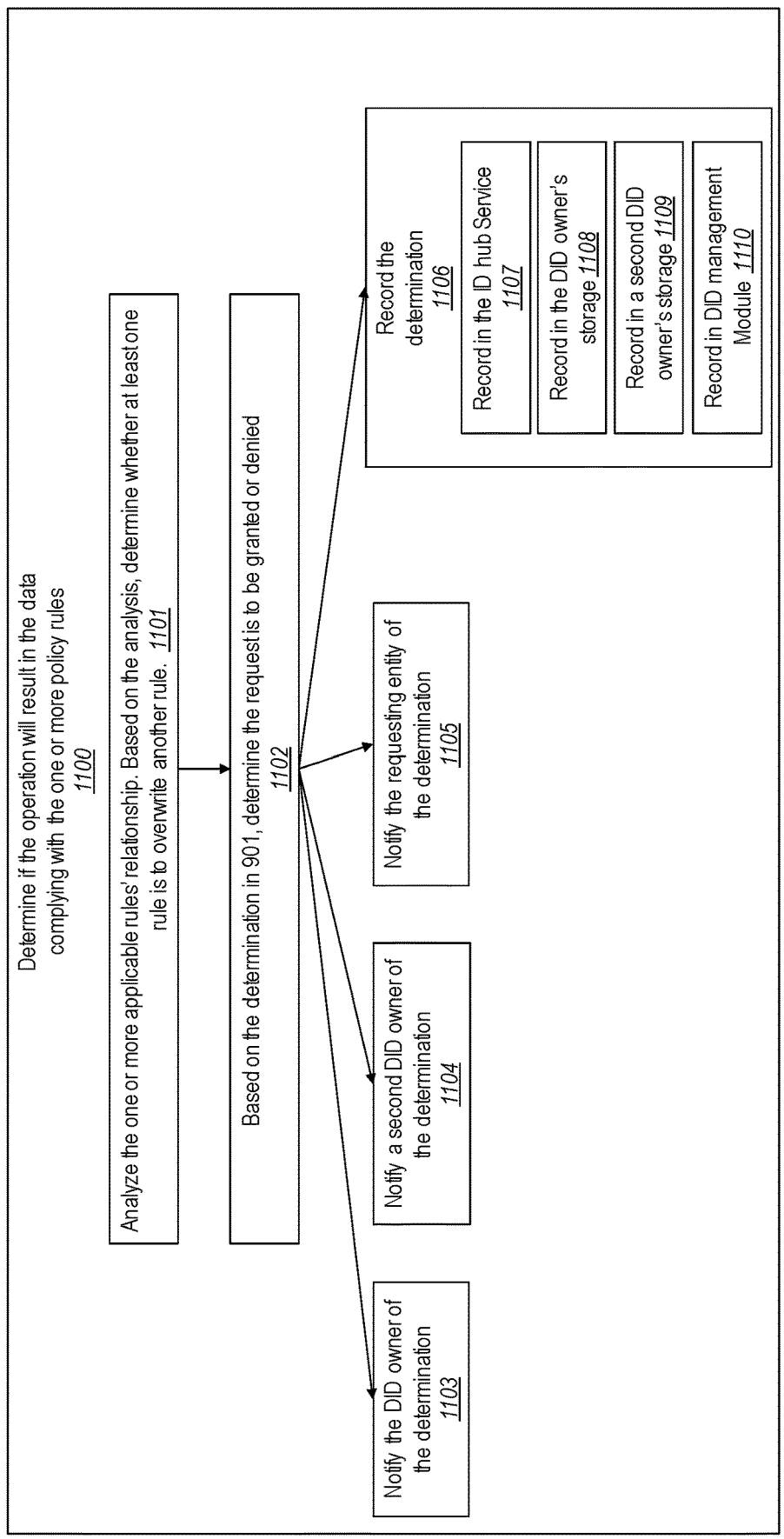
FIG. 11 illustrates a flow chart of an example method for determining whether an operation on data will result in the data complying with the one or more policy rules.

FIG. 11 illustrates a flow chart of an example method 1100 for determining if the operation will result in the data complying with one or more policy rules which may correspond to an embodiment of step 705 of method 700. The method 1100 may include analyzing the one or more applicable rules' relationships, and based on the analysis, determine whether one rule is to overwrite another rule (1101).

The one or more applicable rules may be overlapping and/or complementary to each other. The one or more applicable rules may also be conflicted to each other. In particular, certain third-party rules may be conflicted with certain personal rules. For example, government regulations may require that certain data be retained for a threshold number of years, that certain data should not be allowed to be altered once it is entered, that certain data should not be accessed by a third party even if the DID owner consents (e.g., the DID owner is a minor), etc.

For instance, a government may require tax records be retained for at least 3 years. In such a case, even if the DID owner wants to delete his/her tax record, or grants permission for another party to delete such record, the applicable rules may prohibit such an operation. Similarly, if the DID owner wants to alter his/her criminal record, the government rule may prohibit such a request. Thus, even though the DID owner's criminal record may be stored in his/her personal storage, he/she may not be allowed to have his criminal record be altered. Another example, the DID owner may be a minor, who has consented to disclose some of his/her personal record to a third party. Even though such consent would generally allow a third party to access the personal data of an adult, when the DID owner is a minor, the consent may be overwritten with a default denial.

Based on the determination of whether at least one rule is to overwrite another rule 1101, a final determination is made of whether the request is to be granted or denied (1102). The final determination may then be sent to a party (1103, 1104, 1105) and/or be recorded in a storage (1106). The determination may be sent to one or more parties including, but not limited to, the DID owner (e.g., the DID owner's management module 630, the DID owner's personal storage 660, the DID owner's email address, the DID owner's phone number via SMS, etc.), a second DID owner (e.g., a parent of minor), and/or the requesting entity 610 simultaneously or sequentially.

After the rule enforcement modules 650 and/or 664 makes the determination, the rule enforcement modules 650 and/or 664 may further determine whether the determination should be sent to the DID owner, some other DID owners, and/or the requesting entity. In some embodiments, the determination may be sent to the DID owner (1103). For example, the rule enforcement module 650 and/or 664 may generate a notification on the DID owner's DID management module and notifies the DID owner that a request has been granted or denied. In some embodiments, the determination may also be sent to a second DID owner (1004). For example, when the DID owner is a minor, his/her parents or guardians may be notified of the determination. Another example, one user may have multiple DIDs, or each of the same user's devices has a separate DID, and the user would like to receive a notification on each of his/her devices. In some embodiments, the determination may also be sent to the requesting entity (1105). Especially, when the request is denied, the requesting entity 610 should be informed the denial. Such a notification may be a simple denial, or include additional information, e.g., the reason of the denial, etc.

In some embodiments, the determination may be recorded in the ID hub service (1107), in the personal storage of the DID owner (1108), in the personal storage of a second DID owner (1109), and/or in the DID management module (1110). The recorded determinations may be stored with the rules as part of the rule application history. When a similar request is received, the determination of the similar request generally should be similar to the determination of the past requests. If the new request's determination is different than those in the records, additional notification or alert may be generated and sent to the DID owner, or the request may be temporarily suspended pending the DID owner's approval or confirmation.

Figure 12:
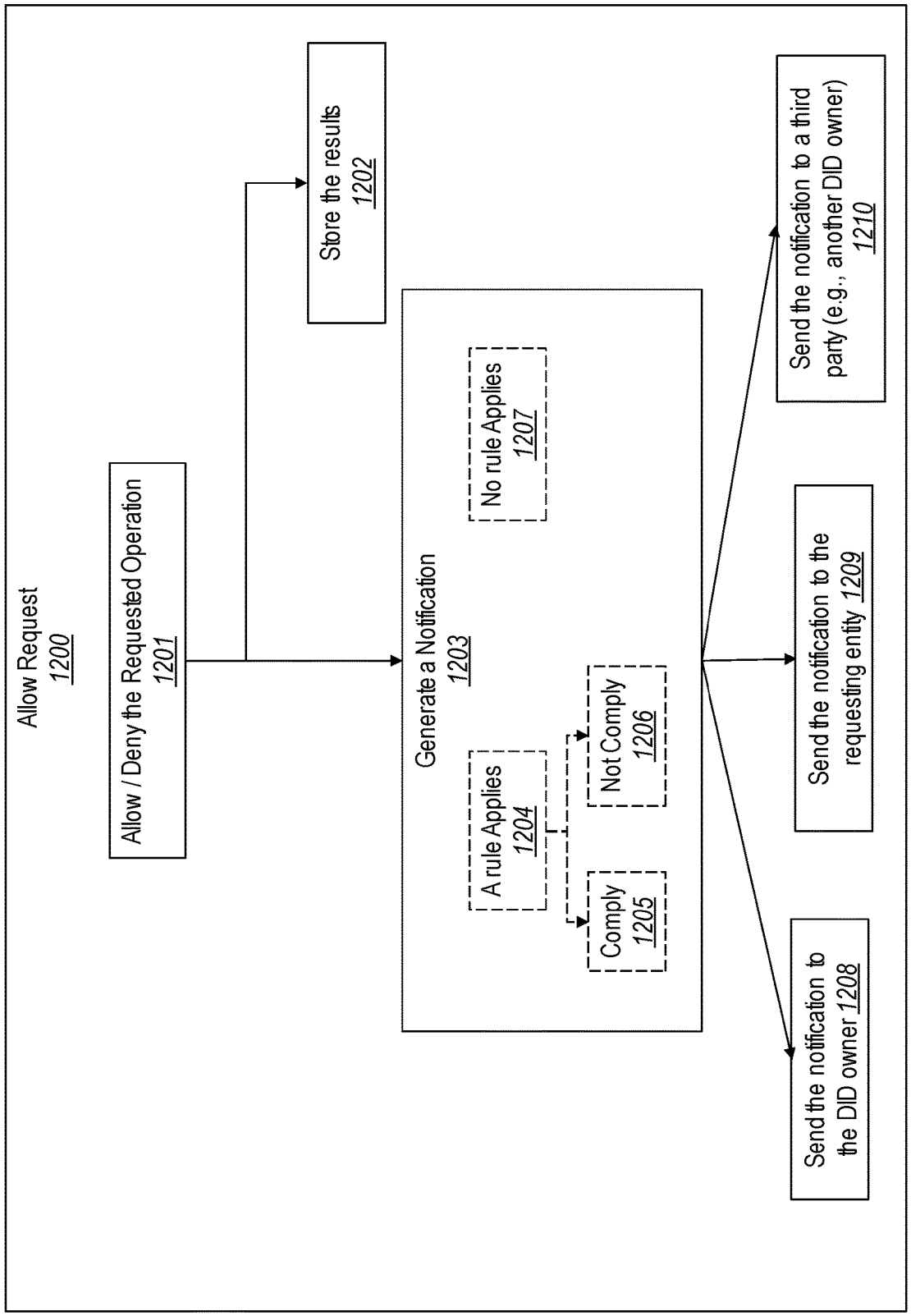
FIG. 12 illustrates a flow chart of an example method for allowing (or denying) access to data requested.

FIG. 12 illustrates a flow chart of an example method 1200 for allowing (or denying) the request which may correspond to an embodiment of step 706 and/or 707 of method 700. After a determination is made that the operation will result in the data complying or not complying with the one or more policy rules, the rule enforcement modules 650 and/or 644 will allow or deny the data operation (1201). If there is no rule applies, the rule enforcement modules 650 and/or 644 may have a default operation, such as denying the request when no rule applies, or allowing the requests when no rule applies, or ask the DID owner for permission on the fly. After the operation is denied or allowed (1201), the operation results may be stored in a storage (1202). The storage used to store the user indication and/or the operation results may be one or more storages illustrated in FIGS. 6 and 8, including, but not limited to, the DID owner's DID management module 631, the DID owner's personal storage 660, the ID hub service 640, and the policy rule library 620. Alternatively, or in addition, the operation results may also be stored in a block chain.

In some embodiments, a notification may be generated (1203). The notification may include information about whether a rule is applicable (1204), what is the applicable rule(s), whether the rule was complied (1205) or not complied (1206). If there is no applicable rules, a DID owner may be notified that by default the requested operation is denied or allowed. For example, when Alice's medical doctor updated Alice's medical history, Alice may receive a notification to show her that certain rules that are applicable to medical data are applied (1204) and that the medical doctor's operation on her medical data 661 complied with those rules (1205). The notification may also include additional information, such as whether Alice's medical data 661 has been modified, or whether her medical data 661 was merely read by her medical doctor.

In some embodiments, when no rule is applicable, the request may be temporarily suspended, and a notification may be generated to prompt the DID owner to generate a rule on the fly. If the DID owner response to the notification within a predetermined time, the request may be allowed or denied based on the DID owner's response; if the DID owner does not response within the predetermined time, the request may be denied.

Furthermore, a notification not only may be sent to the DID owner 1208, but also be sent to the requesting entity (1209) and/or a third party (1210), such as a parent of a minor. In some embodiments, whether a party is to receive a notification or how much information is included in a notification may be set by the DID owner and/or the requesting entity. For example, Alice may decide whether she wants to receive a notification when her data is accessed. She may not want to receive any notification when her social media data 662 is accessed, but she may want to receive a detailed notification when her medical data is accessed.

Figure 13:
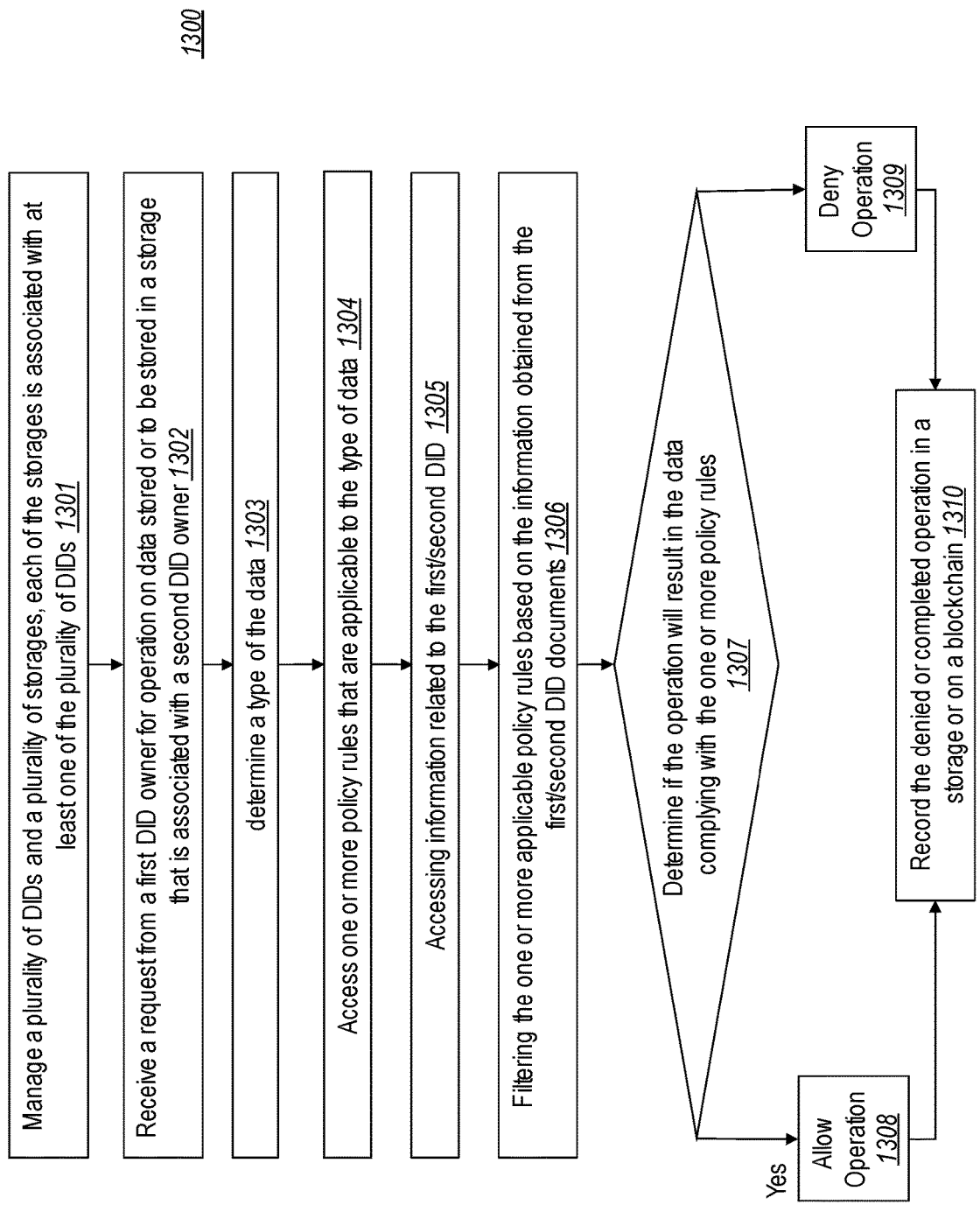
FIG. 13 illustrates a flow chart of an example method for enforcing one or more policy rules when a DID owner requests to access another DID owner's data or data storage.

As discussed in FIGS. 2-4, in a decentralized system, many users will use a decentralized identifier to identify themselves. In such an environment, an entity who requests to access a DID owner's data may be another DID owner or the DID owner him/herself. FIG. 13 illustrates a flow chart of an example method 1300 for enforcing one or more policy rules when a DID owner requests to access another DID owner's data or data storage. Under certain circumstances, the two DID owners may be the same.

The method 1300 includes managing a plurality of DIDs and a plurality of storages (1301). Each of the storages is associated with at least one of the plurality of DIDs. The method 1300 also includes receiving a request from a first DID owner for operation on data stored or to be stored in a storage that is associated with a second DID owner (1302). As mentioned above, the first and second DID owners may have the same DID, i.e., are the same DID owner. Alternatively, the first and second DID owners may have different DIDs, i.e., are different DID owners.

After receiving the request, a type of the requested data is then determined (1303). Based on the determined type of data, one or more policy rules that are applicable to the type of data are accessed (1304). Information related to the first and/or second DID (or DID owners) may be accessed (1305). Thereafter, based on the information of the first and/or second DID (or DID owners), the one or more applicable rules may be further filtered to generate a subset of one or more policy rules (1306). For example, the first and/or second DID owner's geographic location may be used to determine whether a particular country's rule is applicable.

Based on the subset of the one or more policy rules, a determination is made of whether the operation will result in the data complying with the subset of the one or more policy rules (1307). If the determination is to allow the operation on the data, the first DID owner will be granted permission to access the data (1308); and if the determination is to deny the operation on the data, the first DID owner will be denied the permission to access the data (1309). Then, the record of the completed operation may be recorded in storage or on a blockchain (1310). If the record of the completed operation is recorded on a blockchain, a chain of operations on the same piece of data can be retrieved from the blockchain conveniently.

For example, the requested data may be Alice's medical data. The first DID owner may be Alice's family doctor. Based on the type of the data (e.g., medical data), one or more policy rules that are applicable to medical data are accessed. Information related to Alice's DID and the family doctor's DID may also be accessed. Based on the information related to Alice's DID and/or the family doctor's DID, the one or more policy rules may then be filtered. The information related to Alice and/or the family doctor's DID may include their doctor-patient relationship, the location of Alice and/or the location of the family doctor. Based on the additional information of the first and second DID owners, a subset of one or more policy rules that are applicable to Alice's medical data may be filtered out. If Alice and her medical doctor are both located in the U.S., the U.S. rules are applicable (e.g., the HIPAA Privacy Rule may be one of them). Each of the subset of the policy rules is then applied to Alice's medical data. In this case, the operation probably will result in the data complying with the subset of the one or more policy rules. Thus, Alice's family doctor is likely to be granted permission to update Alice's medical data.

After Alice's medical data is updated by her family doctor, some of the information related to the transaction may be recorded in the blockchain. For example, the time of the data entry, the medical doctor's DID information, and Alice's DID information may all be recorded in the blockchain. Such a blockchain may be a private blockchain since the records are related to personal medical data, unless the information stored in the blockchain cannot readily trace to Alice's personal identity. Exactly what types of data will be recorded in a blockchain will be determined based on the type of data, the type of data operations, the applicable rules, and the type of decentralized services. The sensitive information can always stored in Alice's personal storage 660 and/or her DID management module 631.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
   one or more processors; and
   one or more computer-readable storage devices having thereon computer-executable instructions that are structured such that, when executed by the one or more processors, configure the computing system to:
      host a decentralized storage service that provides a plurality of storages to users associated with decentralized identifiers (DIDs) and uses a distributed ledger to authenticate or authorize users associated with DIDs;
      store a plurality of policy rules at the decentralized storage service, the plurality of policy rules being applicable to (1) data stored in at least one of the plurality of storages and (2) entities that request for operating on the data, and the at least one of the plurality of storages being associated with a first DID;
      cause an entity associated with a second DID to receive the first DID to access the distributed ledger that contains a hash of the first DID to obtain a DID document associated with the first DID that contains a service end point of the decentralized storage service, and to access the service end point of the decentralized storage service to request for data of the user stored at the decentralized storage service;
      receive a request from the entity for operating on data stored in the at least one of the plurality of storages that is associated with the first DID;
      authenticate the entity associated based on the second DID and the distributed ledger;
      determine a type of the data that is requested to be operated on;
      access one or more of the stored plurality of policy rules that are applicable to the type of the data and the entity;
      based on the one or more policy rules, determine if the operation to be performed on the data will result in the data complying with the one or more policy rules;
      based on the determination, allow the request when the operation will result in the data complying with the one or more policy rules; and
      in response to completion of the operation by the entity associated with the second DID, record a transaction associated with the operation in the distributed ledger.

2. The computing system of claim 1, wherein the computing system further configured to:
   access information related to the first DID;
   based on the information related to the first DID, filter the one or more policy rules to determine a subset of one or more policy rules that are applicable to the requested data of the first DID,
   wherein the determine if the operation to be performed on the data will result in the data complying with the one or more policy rules is determined based on the subset of one or more policy rules.

3. The computing system of claim 1, wherein the request from an entity for operating on data is a request to store data generated by the entity in the storage associated with the first DID or a request to read data stored in the storage associated with the first DID.

4. The computing system of claim 2, wherein the determining if the operation to be performed on the data will result in the data complying with the one or more policy rules comprises:
   analyzing one or more relationships among the one or more applicable rules, and
   based on the analysis, determining whether at least one rule is to overwrite another rule.

5. The computing system of claim 1, wherein the determining the type of the data comprises:
   scanning metadata of the data, and
   based on the scanned metadata, determining at least one type of the data.

6. The computing system of claim 1, wherein the one or more policy rules include a personal rule that is determined by a user associated with the first DID,
   when the personal rule is stricter than a third-party rule, the personal rule is to overwrite the third-party rule, and
   when the third-party rule is stricter than the personal rule, the third-party rule is to overwrite the personal rule.

7. The computing system of claim 1, wherein:
   at least one of the one or more policy rules are stored in the storage associated with the first DID,
   at least one of the one or more policy rules is stored with at least one of the plurality of storages;

at least one of the one or more policy rules is stored at a remote server, and/or at least one of the one or more policy rules is stored at a DID management module associated with a user associated with the first DID.

8. The computing system of claim 1, further configured to:

based on information of the entity, filter the one or more policy rules to determine a subset of one or more policy rules that are applicable to the requested data, wherein determining if the operation to be performed on the data will result in the data complying with the one or more policy rules is based on the subset of one or more policy rules.

9. The computing system of claim 1, wherein the allowing the request comprises:

generating a notification to a user associated with the first DID or the entity associated with the second DID when the operation to be performed on the data will result in the data not complying with the one or more policy rules.

10. The computing system of claim 1, wherein the second DID is same as the first DID or different from the first DID.

11. The computing system of claim 10, the computing system further configured to:

filtering the one or more policy rules based on geographic information of a user associated with the first DID and/or information of the entity associated with the second DID to determine a subset of one or more policy rules that are applicable to the requested data, wherein the determine if the operation to be performed on the data will result in the data complying with the one or more policy rules is determined based on the subset of one or more policy rules.

12. A method for enforcing one or more policy rules that are applicable to a type of data at a decentralized storage service, the method comprising:

hosting a decentralized storage service that provides a plurality of storages to users associated with decentralized identifiers (DIDs) and uses a distributed ledgers to authenticate or authorize users associated with DIDs;

storing a plurality of policy rules in the decentralized storage service, the plurality of policy rules being applicable to (1) data stored in at least one of the plurality of storages and (2) entities that request for operating on the data, and the at least one of the plurality of storages being associated with a first DID;

causing an entity associated with a second DID to receive the first DID to access the distributed ledger that contains a hash of the first DID to obtain a DID document associated with the first DID that contains a service end point of the decentralized storage service, and to access the service end point of the decentralized storage service to request for data of the user stored at the decentralized storage service;

receiving a request from the entity for operating on data stored in one of the plurality of storages that is associated with the first DID;

authenticating the entity based on the second DID and the distributed ledger;

determining a type of the data that is requested to be operated on;

accessing one or more policy rules that are applicable to the type of the data and the entity;

based on the one or more of the stored plurality of policy rules, determining if the operation to be performed on the data will result in the data complying with the one or more policy rules;

based on the determination, allowing the request when the operation will result the data complying with the one or more policy rules; and in response to completion of the operation by the entity associated with the second DID, recording a transaction associated with the operation in the distributed ledger.

13. The method of claim 12, the method further comprising:

filtering the one or more policy rules based on information of a user associated with the first DID or information of the entity associated with the second DID to determine a subset of one or more policy rules that are applicable to the requested data, wherein determining if the operation to be performed on the data will result in the data complying with the one or more policy rules is based on the subset of one or more policy rules.

14. The method of claim 12, wherein the request is a request to store data generated by the entity in a storage associated with a user associated with the first DID or a request to read data stored in the at least one storage associated with the first DID.

15. The method of claim 12, wherein the determining if the operation to be performed on the data will result in the data complying with the one or more policy rules comprises:

analyzing relationship among the one or more applicable rules, and based on the analysis, determining whether at least one rule is to overwrite another rule.

16. The method of claim 12, wherein determining the type of the data comprises:

scanning metadata of the data, and based on the scanned metadata, determining at least one type of the data.

17. The method of claim 12, wherein the one or more policy rules include a personal rule that is determined by a user associated with the first DID.

18. The method of claim 12, wherein the allowing the request comprises:

generating a notification to a user associated with the first DID or the entity associated with the second DID when the operation to be performed on the data will result in the data not complying with the one or more policy rules.

19. A computer program product comprising one or more hardware storage devices having stored thereon computer-executable instructions that are structured such that, when the computer-executable instructions are executed by one or more processors of a computing system, the computer-executable instructions configure the computing system to perform at least:

host a decentralized storage service that provides a plurality of storages to users associated with decentralized identifiers (DIDs) and uses a distributed ledger to authenticate or authorize users associated with DIDs;

store a plurality of policy rules at the decentralized storage service, the plurality of policy rules being applicable to (1) data stored in at least one of the plurality of storages and (2) entities that request for operating on the data, and the at least one of the plurality of storages being associated with a first DID;

cause an entity associated with a second DID to receive the first DID to access the distributed ledger that contains a hash of the first DID to obtain a DID document associated with the first DID that contains a service end point of the decentralized storage service, and to access the service end point of the decentralized storage service to request for data of the user stored at the decentralized storage service;

receive a request from the entity for operating on data stored in the at least one storage that is associated with the first DID;

authenticate the entity based on the second DID and the distributed ledger;

determine a type of the data that is requested to be operated on;

access one or more of the stored plurality of policy rules that are applicable to the type of the data and the entity;

based on the one or more policy rules, determine if the operation to be performed on the data will result in the data complying with the one or more policy rules;

based on the determination, allow the request when the operation will result the data complying with the one or more policy rules; and in response to completion of the operation by the entity associated with the second DID, record a transaction associated with the operation in the distributed ledger.

20. The computer program product of claim 19, wherein the computing system further configured to:

access information related to the first DID;

based on the information related to the first DID, filter the one or more policy rules to determine a subset of one or more policy rules that are applicable to the requested data of the first DID, wherein determining if the operation to be performed on the data will result in the data complying with the one or more policy rules is based on the subset of one or more policy rules.

* * * * *